US012785781B2

(12) United States Patent
Park et al.

(10) Patent No.: US 12,785,781 B2
(45) Date of Patent: Nov. 3, 2026

(54) CONFIGURABLE BEAM MANAGEMENT OF SIDELINK RESOURCES TO SUPPORT DIRECTION DETERMINATION

(71) Applicant: SHARP KABUSHIKI KAISHA, Sakai City (JP)

(72) Inventors: Kenneth James Park, Vancouver, WA (US); Kazunari Yokomakura, Sakai City (JP); Zhanping Yin, Vancouver, WA (US); John Michael Kowalski, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 434 days.

(21) Appl. No.: 18/022,576

(22) PCT Filed: Aug. 26, 2021

(86) PCT No.: PCT/JP2021/031417
§ 371 (c)(1),
(2) Date: Feb. 22, 2023

(87) PCT Pub. No.: WO2022/045268
PCT Pub. Date: Mar. 3, 2022

(65) Prior Publication Data

US 2023/0319911 A1 Oct. 5, 2023

Related U.S. Application Data

(60) Provisional application No. 63/071,101, filed on Aug. 27, 2020.

(51) Int. Cl.
*H04W 4/40* (2018.01)
*H04B 7/06* (2006.01)
(Continued)

(52) U.S. Cl.
CPC ........ *H04B 7/06954* (2023.05); *H04W 16/28* (2013.01); *H04W 72/02* (2013.01); *H04W 76/14* (2018.02)

(58) Field of Classification Search
CPC . H04B 7/06954; H04B 7/0695; H04W 16/28; H04W 72/02; H04W 76/14; H04W 4/40; H04W 72/20
(Continued)

(56) References Cited

U.S. PATENT DOCUMENTS 12,550,204 B2 * 2/2026 Park ...................... H04W 72/02
2017/0272222 A1 * 9/2017 Fröberg Olsson .... H04L 5/0073
(Continued)

FOREIGN PATENT DOCUMENTS

WO 2019/051231 A1 3/2019

OTHER PUBLICATIONS

3GPP TS 23.287 V16.3.0 (Jul. 2020) 3rd Generation Partnership Project; Technical Specification Group Services and System Aspects; Architecture enhancements for 5G System (5GS) to support Vehicle-to-Everything (V2X) services (Release 16), 57 pages (TLW).
(Continued)

*Primary Examiner* — Christopher T Wyllie
*Assistant Examiner* — Tracy L Williams
(74) *Attorney, Agent, or Firm* — ScienBiziP, P.C.

(57) ABSTRACT

A method performed by a User Equipment (UE) for sidelink (SL) communication with another UE is provided. The method includes establishing a first SL connection between the UE and the other UE using a first resource set; receiving, from the other UE, a Quality of Service (QoS) value associated with a first beam of a first set of directional transmission beams used for establishing the first SL connection; and reporting, to a New Radio (NR) Vehicle to Everything (V2X) Control Function, the identifier (ID) of
(Continued)

the first resource set, a first beam index identifying the first beam, and the QoS value associated with the first beam. The first resource set includes the ID of the first resource set, parameters for configuring a first V2X Resource Pool, and Beam Management (BM) parameters associated with the first V2X Resource Pool for enabling the first set of directional transmission beams.

15 Claims, 11 Drawing Sheets

(51) Int. Cl.

*H04W 16/28* (2009.01)
*H04W 72/02* (2009.01)
*H04W 72/20* (2023.01)
*H04W 76/14* (2018.01)

(58) Field of Classification Search

USPC .......................................................... 370/329

See application file for complete search history.

(56) References Cited

U.S. PATENT DOCUMENTS

| | | | | |
|---|---|---|---|---|
| 2019/0281485 | A1* | 9/2019 | da Silva | H04B 7/0626 |
| 2019/0319840 | A1* | 10/2019 | Cheng | H04W 28/0268 |
| 2020/0252989 | A1 | 8/2020 | Chen et al. | |
| 2021/0153062 | A1* | 5/2021 | Zhang | H04W 72/51 |
| 2022/0015070 | A1* | 1/2022 | Chen | H04W 72/1263 |
| 2022/0225434 | A1* | 7/2022 | Kim | H04W 76/30 |
| 2022/0330038 | A1* | 10/2022 | Ganesan | H04W 8/005 |
| 2023/0056442 | A1* | 2/2023 | Ly | H04W 24/10 |
| 2023/0156667 | A1* | 5/2023 | Thomas | H04W 48/16 370/329 |
| 2023/0180187 | A1* | 6/2023 | Kim | H04W 72/51 370/329 |

OTHER PUBLICATIONS

3GPP TS 38.101-1 V16.4.0 (Jun. 2020) 3rd Generation Partnership Project; Technical Specification Group Radio Access Network; NR; User Equipment (UE) radio transmission and reception; Part 1: Range 1 Standalone (Release 16), 406 pages (TLW).

3GPP TS 38.101-2 V16.4.0 (Jun. 2020) 3rd Generation Partnership Project; Technical Specification Group Radio Access Network; NR; User Equipment (UE) radio transmission and reception; Part 2: Range 2 Standalone (Release 16), 172 pages (TLW).

3GPP TS 38.104 V15.1.0 (Mar. 2018) 3rd Generation Partnership Project; Technical Specification Group Radio Access Network; NR; Base Station (BS) radio transmission and reception (Release 15), 133 pages (TLW).

3GPP TS 38.331 V15.10.0 (Jul. 2020) Brd Generation Partnership Project; Technical Specification Group Radio Access Network; NR; Radio Resource Control (RRC) protocol specification (Release 15), 539 pages (TLW).

Xiaomi, "New Study on Ranging-based Services", S1-202304, 3GPP TSG-SA WG1 Meeting #90-e, E-meeting, May 18-22, 2020, 3 pages (TLW).

3GPP TR 22.885 V14.0.0 (Dec. 2015) 3rd Generation Partnership Project; Technical Specification Group Services and System Aspects; Study on LTE support for Vehicle to Everything (V2X) services (Release 14), 50 pages (TLW).

Vivo, "Enhancements of Uu link to control sidelink", R1-1812310, 3GPP TSG RAN WG1 Meeting #95 Spokane, USA, Nov. 12-16, 2018, 5 pages (TLW).

Fujitsu, "Control Channel Design and its Efficient Transmission in NR-V2X", R1-1912077, 3GPP TSG RAN WG1 #99 Reno, USA, Nov. 18-22, 2019, 14 pages (TLW).

* cited by examiner

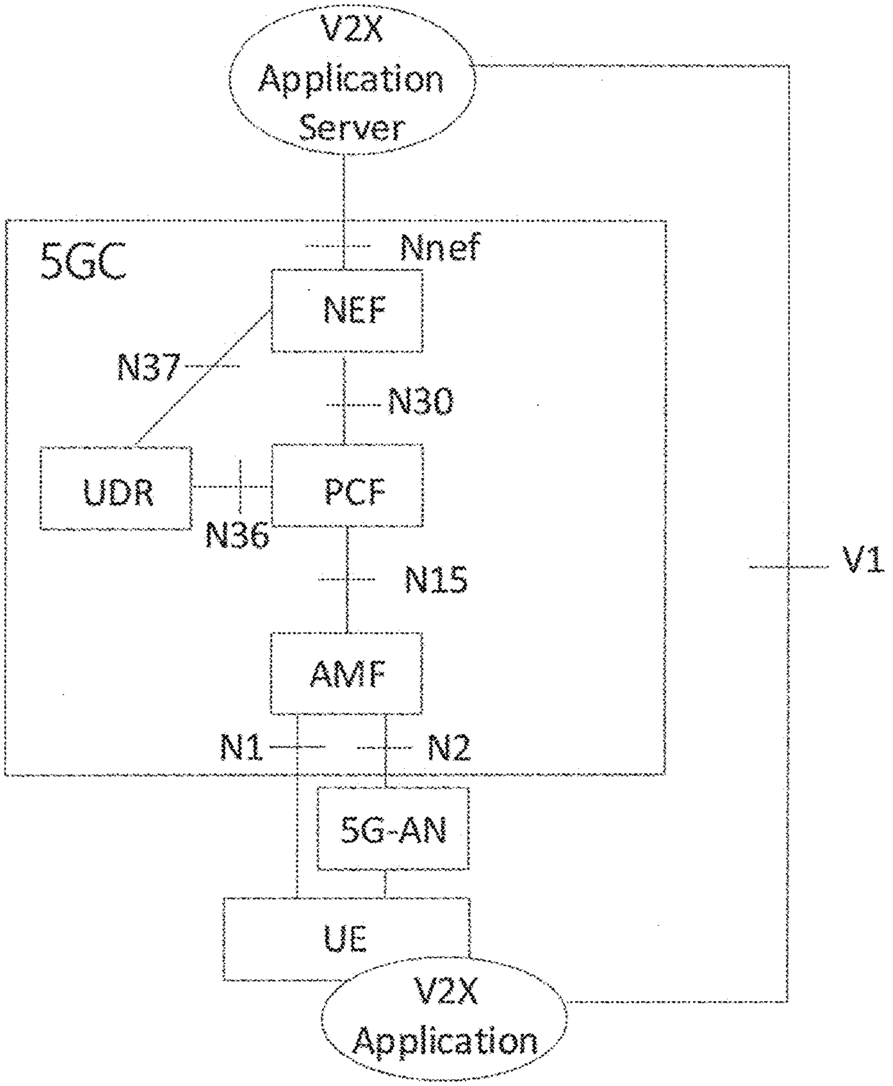
FIG. 2 Prior Art

Resource set 1:
- Unique set identifier
- Parameters for configuring a NR V2X Resource Pool.
  - SL-V2X-Config-NR
- Parameters for configuring a set of directional Tx beams.
  - Number of Tx beams in the set (1..n)
  - Beam width for each Tx beam of the set ([1,20deg], [2,20deg], [3,20deg],...,[n,Xdeg])
  - Projection of each beam in the set ([1,Az,Alt],[2,Az,Alt],[3,Az, Alt],...,[n,Az,Alt])

Resource set 2:
- Unique set identifier
- Parameters for configuring a NR V2X Resource Pool.
  - SL-V2X-Config-NR
- Parameters for configuring a set of directional Tx beams,
  - Number of Tx beams in the set (1..n)
  - Beam width for each Tx beam of the set ([1,10deg], [2,10deg], [3,10deg],...,[n,Xdeg])
  - Projection of each beam in the set ([1,Az,Alt],[2,Az,Alt],[3,Az, Alt],...,[n,Az,Alt])

Resource set n:
- Unique set identifier
- Parameters for configuring a NR V2X Resource Pool.
  - SL-V2X-Config-NR
- Parameters for configuring a set of directional Tx beams,
  - Number of Tx beams in the set (1..n)
  - Beam width for each Tx beam of the set ([1,10deg], [2,5deg], [3,5deg],...,[n,Xdeg])
  - Projection of each beam in the set ([1,Az,Alt],[2,Az,Alt],[3,Az, Alt],...,[n,Az,Alt])

FIG. 4

UE Capability:

- Direction Determination Supported [Y, N]
- Antenna #1 parameters,
  - Frequency range of Antenna [ARFCN-low, ARFCH-hi]
  - Number of antenna array elements
  - Default orientation of the axis of the Tx antenna array in Horz Plane with respect to top of handset [xDeg]
  - Default orientation in Vert Plane to intersect Horz Plane[yDeg]
  - ....Other STUFF TBD
- Antenna #2 parameters,
  - Frequency range of Antenna [ARFCN-low, ARFCH-hi]
  - Number of antenna array elements
  - Default orientation of the axis of the Tx antenna array in Horz Plane with respect to top of handset [xDeg]
  - Default orientation in Vert Plane to intersect Horz Plane[yDeg]
  - ....Other STUFF TBD
- .......

FIG. 6

FIG. 7

SIB12 message

```
-- ASN1START
-- TAG- SIB12-START

SIB12-r16 ::=                    SEQUENCE {
    segmentNumber-r16                INTEGER (0..63),
    segmentType-r16                  ENUMERATED {notLastSegment, lastSegment},
    segmentContainer-r16             OCTET STRING
}
SIB12-IEs-r16 ::=                SEQUENCE {
    sl-ConfigCommonNR-r16            SL-ConfigCommonNR-r16,
    ..
    criticalExtensions                       CHOICE {
        sl-Direction-Not-Allowed             ENUMERATED {true, false]
        sl-DirConfigCommonNR-r17              SL-DirConfigCommon-r17,
        criticalExtensionsFuture              SEQUENCE {}
    }
    lateNonCriticalExtension         OCTET STRING                OPTIONAL,
    ...
}

...//text removed for brevity//

SL-DirConfigCommonNR-r17 ::=      SEQUENCE {
    sl-DirConfigID ::=                 INTEGER {1}
    sl-DirRangingCommonUE-r17 :=       SEQUENCE {
        sl-Dir
        sl-DirCSI-RS-Config              SL-CSI-RS-Config-r17,
        sl-DirConfigCommonNR-r17         SL-ConfigCommonNR-r16,
    }
    Sl-DirRangedUE-r17                   CSI-ReportConfig
}

SL-CSI-RS-Config-r17 ::=            SEQUENCE {
    si-csi-RS-ResourceSetList           CHOICE {
        sl-CSI-RS-SSB                   SEQUENCE {
            sl-CSI-RS-ResourceSetList      SEQUENCE (SIZE (1..maxNrofSL-CSI-RS-ResourceSetsPerConfig)) OF SL-CSI-RS-ResourceSet   OPTIONAL,  -- Need R
            sl-SSB-ResourceSetList         SEQUENCE (SIZE (1..maxNrofSL-SSB-ResourceSetsPerConfig)) OF SL-SSB-ResourceSet         OPTIONAL   -- Need R
        },
    }
    ...
}

SL-CSI-RS-ResourceSet ::=           SEQUENCE {
    sl-CSI-ResourceSetId                SL-CSI-RS-ResourceSetId,
    sl-CSI-RS-Resources                 SEQUENCE (SIZE (1..maxNrofSL-CSI-RS-ResourcesPerSet)) OF SL-CSI-RS-Resources,
    repetition                          ENUMERATED { on, off }                                        OPTIONAL,    -- Need S
}

SL-CSI-RS-Resources ::=              SEQUENCE {
    SL-CSI-RS-ResourceId                 SL-CSI-RS-ResourceId
    sl-CSI-RS-FreqAllocation-r16         CHOICE {
        sl-OneAntennaPort-r16                BIT STRING (SIZE (12)),
        sl-TwoAntennaPort-r16                BIT STRING (SIZE (6))
    }                                                                                                  OPTIONAL,  -- Need M
    sl-CSI-RS-FirstSymbol-r16            INTEGER (3..12)                                               OPTIONAL,  -- Need M
    ...
}
-- TAG-SIB12-STOP
-- ASN1STOP
```

FIG. 8

*RRCReconfiguration message*

```
-- ASN1START
-- TAG-RRCRECONFIGURATION-START

RRCReconfiguration ::=              SEQUENCE {
    rrc-TransactionIdentifier           RRC-TransactionIdentifier,
    criticalExtensions                  CHOICE {
        rrcReconfiguration                  RRCReconfiguration-IEs,
        criticalExtensionsFuture            SEQUENCE {}
    }
}

RRCReconfiguration-IEs ::=          SEQUENCE {
    radioBearerConfig                   RadioBearerConfig                                   OPTIONAL, -- Need M
    secondaryCellGroup                  OCTET STRING (CONTAINING CellGroupConfig)           OPTIONAL, -- Cond SCG
    measConfig                          MeasConfig                                          OPTIONAL, -- Need M
    lateNonCriticalExtension            OCTET STRING                                        OPTIONAL,
    nonCriticalExtension                RRCReconfiguration-v1530-IEs                        OPTIONAL
}

...//text removed for brevity//

RRCReconfiguration-v1610-IEs ::=    SEQUENCE {
    otherConfig-v1610                   OtherConfig-v1610                                   OPTIONAL, -- Need M
    bap-Config-r16                      SetupRelease { BAP-Config-r16 }                     OPTIONAL, -- Need M
    iab-IP-AddressConfigurationList-r16 IAB-IP-AddressConfigurationList-r16                 OPTIONAL, -- Need M
    conditionalReconfiguration-r16      ConditionalReconfiguration-r16                      OPTIONAL, -- Need M
    daps-SourceRelease-r16              ENUMERATED{true}                                    OPTIONAL, -- Need N
    t316-r16                            SetupRelease {T316-r16}                             OPTIONAL, -- Need M
    needForGapsConfigNR-r16             SetupRelease {NeedForGapsConfigNR-r16}              OPTIONAL, -- Need M
    onDemandSIB-Request-r16             SetupRelease { OnDemandSIB-Request-r16 }            OPTIONAL, -- Need M
    dedicatedPosSysInfoDelivery-r16     OCTET STRING (CONTAINING PosSystemInformation-r16-IEs) OPTIONAL, -- Need N
    sl-ConfigDedicatedNR-r16            SetupRelease {SL-ConfigDedicatedNR-r16}             OPTIONAL, -- Need M
    sl-ConfigDedicatedEUTRA-Info-r16    SetupRelease {SL-ConfigDedicatedEUTRA-Info-r16}     OPTIONAL, -- Need M
    nonCriticalExtension                RRCReconfiguration-r17-IEs                          OPTIONAL
}

RRCReconfiguration-r17-IEs ::=      SEQUENCE {
    sl-DirConfigDedicatedNR-r17         SL-DirConfigDedicated-r17,
    ...
    nonCriticalExtension                SEQUENCE {}                                         OPTIONAL
}

SL-DirConfigDedicated-r17 ::=       SEQUENCE {
   sl-DirConfigID ::=                   INTEGER (1..SL-MaxDirConfiguration)
   sl-DirRangingCommonUE-r17 ::=        SEQUENCE {
      sl-DirRangingUE-ToAddModList-r17      SEQUENCE (SIZE (1..maxNrofSLRB-r16)) OF SL-CSI-RS-Config-r17   OPTIONAL, -- Need N
      sl-DirRangingUE-ToReleaseList-r17     SEQUENCE (SIZE (1..maxNrofSLRB-r16)) OF SLRB-PC5-ConfigIndex-r16 OPTIONAL, -- Need N
      sl-DirConfigDedicatedNR-r17           SL-ConfigDedicatedNR-r16,
   }
   Sl-DirRangedUE-r17                   CSI-ReportConfig
}
-- TAG-RRCRECONFIGURATION-STOP
-- ASN1STOP
```

FIG. 9

*SidelinkUEInformationNR* message

```
-- ASN1START
-- TAG-SIDELINKUEINFORMATIONNR-START

SidelinkUEInformationNR-r16::=          SEQUENCE {
    criticalExtensions                   CHOICE {
        sidelinkUEInformationNR-r16          SidelinkUEInformationNR-r16-IEs,
        criticalExtensionsFuture             SEQUENCE {}
    }
}

SidelinkUEInformationNR-r16-IEs ::=     SEQUENCE {
    sl-RxInterestedFreqList-r16              SL-InterestedFreqList-r16          OPTIONAL,
    sl-TxResourceReqList-r16                 SL-TxResourceReqList-r16           OPTIONAL,
    sl-FailureList-r16                       SL-FailureList-r16                 OPTIONAL,
    lateNonCriticalExtension                 OCTET STRING                       OPTIONAL,
    nonCriticalExtension                     UE-TxAntennaParamList-R17          OPTIONAL
}

UE-TxAntennaParamList-R17::=            SEQUENCE (SIZE (1..maxNrofTxAntenna-r17)) OF UE-TxAntennaParam-r17

UE-TxAntennaParam-r17  ::=              SEQUENCE {
    antennaParamID                         INTEGER (0..maxNrofTxAntenna-r17-1),
    frequencyRangeLo                       ARFCN-ValueNR                                          OPTIONAL,
    frequencyRangeHi                       ARFCN-ValueNR                                          OPTIONAL,
    numAntennaArrayElements-N1             INTEGER (1..maxNrofTxAntennaN1-Elements-r17)           OPTIONAL,
    numAntennaArrayElements-N2             INTEGER (1..maxNrofTxAntennaN2-Elements-r17)           OPTIONAL,
    AntennaAzimuthToTopDevice              INTEGER (0..359)                                       OPTIONAL,
    AntennaZenithToAzimuth                 INTEGER (-180..180)                                    OPTIONAL,
    nonCriticalExtension                   SL-DirDetrminationResult-r17                           OPTIONAL

}

SL-DirDetrminationResult-r17 ::=        SEQUENCE {
    sl-DirConfigID ::=                   INTEGER (0..SL-MaxDirConfiguration)
    BeamID                               YYYY
    BeamQoS                              XXXX
    UE-Pich                              INTEGER (-180..180)
    UE-Roll                              INTEGER (-180..180)
    UE-Yaw                               INTEGER (0..359)
    sl-CSI-ReportConfig                  SL-CSI-ReportConfig
}


SL-CSI-ReportConfig ::=              SEQUENCE {
    reportConfigId                           CSI-ReportConfigId,
    ...
    reportQuantity                           CHOICE {
        none                                     NULL,
        cri-RSRP                                 NULL,
        ssb-Index-RSRP                           NULL,
    },

. . .

-- TAG-SIDELINKUEINFORMATIONNR-STOP
-- ASN1STOP
```

CONFIGURABLE BEAM MANAGEMENT OF SIDELINK RESOURCES TO SUPPORT DIRECTION DETERMINATION

CROSS REFERENCE

This Nonprovisional application claims priority under 35 U.S.C. § 119 on provisional Application No. 63/071,101 on Aug. 27, 2020, the entire contents of which are hereby incorporated by reference.

TECHNICAL FIELD

The present disclosure generally relates to wireless communications, more specifically, relates to configurable beam management of sidelink (SL) resources to support direction determination.

BACKGROUND ART

The 3rd Generation Partnership Project (3GPP) Vehicle to Everything (V2X) services will be used to transport Basic Safety Message (BSM) in the SAE Standard J2735. The BSM includes two parts: BSM Part 1 contains the core data elements (e.g., vehicle size, position, speed, heading acceleration, brake system status), and is transmitted approximately 10× per second; BSM Part 2 contains a variable set of data elements drawn from many optional data elements, and is transmitted less frequently than BSM Part 1. The BSM is expected to have a transmission range of approximately 1,000 meters, and is tailored for localized broadcast required by V2V safety applications.

In the 3GPP Release-14 (Rel-14) Long Term Evolution (LTE) V2X (aka LTE V2X), a basic set of requirements for V2X service in Technical Report (TR) 22.885 is supported, which are considered sufficient for basic road safety service. An LTE V2X enabled vehicle (e.g., a vehicle configured with a UE the supports V2X applications) can directly exchange status information via a PC5 interface for direct communication. In the present disclosure, SL defines the procedures for realizing a single-hop UE-UE communication, similarly to Uplink and Downlink which define the procedures for UE-BS and BS-UE access, respectively. Along the same lines PC5 was introduced as the new direct UE interface, similarly to the Uu (User Equipment (UE)-Base Station(BS)/BS-UE) interface. Thus, the PC5 interface is also known as SL at the physical layer such as position, speed and heading, with other nearby vehicles, infrastructure nodes and/or pedestrians that are also enabled with LTE V2X.

In the 3GPP Release-16 (Rel-16) New Radio (NR) provides higher throughput, lower latency and higher reliability as compared to LTE, via a combination of enchantments to protocol numerology, usage of higher frequency bands (e.g., mm Wave Frequencies) and a selection of wider sub carrier spacing's (SCS) (e.g., 30 kHz, 60 kHz, 120 kHz, and/or 240 kHz, in addition to the 15 kHz used by LTE) to match the higher frequency bands, and process for beam management (BM). The 3GPP Rel-16 NR is expected to provide an enhanced V2X service (aka NR V2X) (see the Service and System Aspects 1 (SA1) Study on Improvement of V2X Service Handling for Rel-16 (aka FS_V2XIMP)) which leverages the higher throughput, lower latency and higher reliability provided by the 3GPP Rel-16 NR data transport services.

The SA1 has a new study in the 3GPP Release-18 (Rel-18) (51-202304) that considers how NR may support a Ranging-based application for the determination of the distance and the direction between two UEs (and not between a UE and the gNB), as this kind of application is not yet served well by the 3GPP.

Therefore, there is a need in the art to investigate methods for configurable beam management of SL resources to support direction determination in the next generation (e.g., $5^{th}$ Generation (5G) New Radio (NR)) wireless communication networks.

SUMMARY OF INVENTION

In one example, a method by a User Equipment (UE) for sidelink (SL) communication with another UE, the method comprising: establishing a first SL connection from the UE to the another UE using a first resource set, the first resource set including an identifier (ID) of the first resource set, parameters for configuring a first Vehicle to Everything (V2X) Resource Pool, and Beam Management (BM) parameters associated with the first V2X Resource Pool for enabling a first set of directional transmission beams; receiving, by the UE from the another UE, a Quality of Service (QoS) value associated with a first beam of the first set of directional transmission beams used for establishing the first SL connection; and reporting, by the UE to a New Radio (NR) V2X Control Function, the ID of the first resource set, a first beam index identifying the first beam, and the QoS value associated with the first beam.

In one example, a method by a User Equipment (UE) for sidelink (SL) communication with another UE, the method comprising: connecting to the another UE through a first SL connection, the first SL connection being established by the another UE using a first resource set, the first resource set including an identifier (ID) of the first resource set, parameters for configuring a first Vehicle to Everything (V2X) Resource Pool, and Beam Management (BM) parameters associated with the first V2X Resource Pool for enabling a first set of directional transmission beams; providing, to the another UE, a Quality of Service (QoS) value associated with a first beam of the first set of directional transmission beams used for establishing the first SL connection.

BRIEF DESCRIPTION OF DRAWINGS

Implementations of the present technology will now be described, by way of example only, with reference to the attached figures.

FIG. 2 illustrates a 5G System architecture for AF-based service parameter provisioning for V2X communications in the 3GPP TS 23.287.

FIG. 4 illustrates contents of example direction ranging configuration resource sets (hereinafter "resource sets") configured by the Network V2X Control Function in accordance with implementations of the present disclosure.

FIG. 6 illustrates an example of a UE capability indication in accordance with an implementation of the present disclosure.

FIG. 7 illustrates an example of a new NR SIB12 in accordance with an implementation of the present disclosure.

FIG. 8 illustrates an example of a new RRC Reconfiguration (RRCReconfiguration) message in accordance with an implementation of the present disclosure.

FIG. 9 illustrates an example of a new Sidelink UE Information NR (SidelinkUEInformationNR) message in accordance with an implementation of the present disclosure.

DESCRIPTION OF EMBODIMENTS

Figure 1:
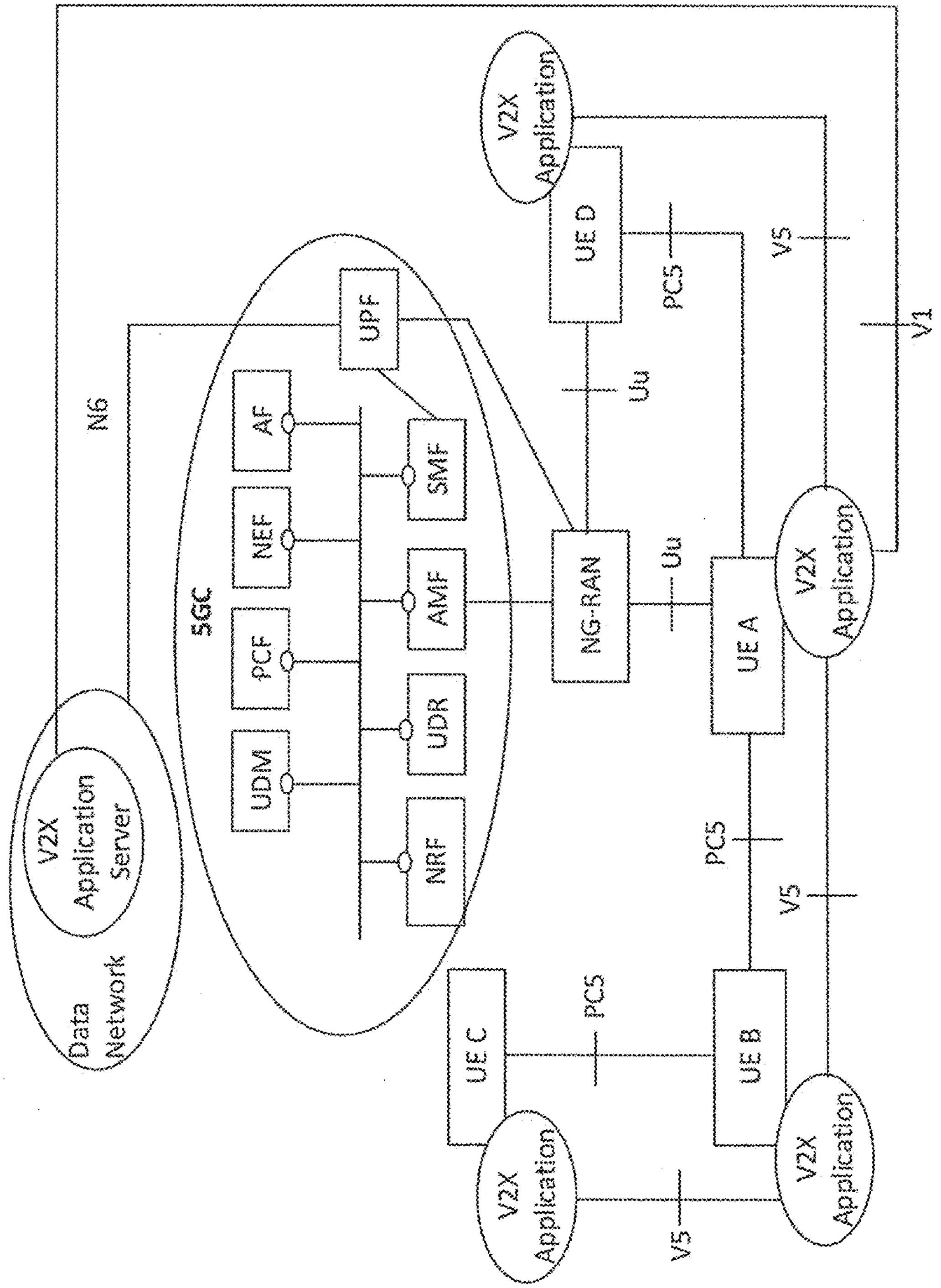
FIG. 1 Prior Art
FIG. 1 illustrates a non-roaming 5G System architecture for V2X communication over PC5 and Uu reference points in the 3GPP Technical Specification (TS) 23.287.

The 3GPP is a collaboration agreement that aims to define globally applicable technical specifications and technical reports for third and fourth generation wireless communication systems. The 3GPP may define specifications for next generation mobile networks, systems and devices.

3GPP LTE is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access network system (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14 and/or 15) including New Radio (NR) which is also known as 5G. However, the scope of the present disclosure should not be limited in this regard. At least some aspects of the systems and methods disclosed herein may be utilized in other types of wireless communication systems.

A wireless communication device may be an electronic device used to communicate voice and/or data to a base station (BS), which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc.

In the 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In the 3GPP specifications, a BS is typically referred to as a Node B, an evolved Node B (eNB), a home enhanced or evolved Node B (HeNB), a next Generation Node B (gNB) or some other similar terminology. As the scope of the disclosure should not be limited to 3GPP standards, the terms "base station," "Node B," "eNB," "HeNB," and "gNB" may be used interchangeably herein to mean the more general term "base station." Furthermore, the term "base station" or "BS" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s).

"Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The 5G communication systems, dubbed NR technologies by the 3GPP, envision the use of time/frequency/space resources to allow for services, such as eMBB transmission, URLLC transmission, and massive Machine Type Communication (mMTC) transmission. Also, in NR, single-beam and/or multi-beam operations is considered for downlink and/or uplink transmissions.

Various examples of the systems and methods disclosed herein are now described with reference to the figures, where like reference numbers may indicate functionally similar elements. The systems and methods as generally described and illustrated in the Figures herein could be arranged and designed in a wide variety of different implementations. Therefore, the detailed description of the present disclosure as illustrated in the figures is not intended to limit scope of the present disclosure but is merely representative of the systems and methods.

Starting with the 3GPP Rel-18, NR is expected to be capable of supporting higher frequencies and enhanced SL channel configurations that enable Beam Management of the SL signals.

Since the 3GPP Rel-18, NR has been capable of NR V2X SL communications, whereby the 5GC (5G Core Network)

configures, and the NG-RAN broadcasts, NR V2X SL communications configuration information in SIB12 for use by NR UEs that provide NR V2X services. SIB12 contains an Information Element (IE) known as SL-ConfigCommonNR-r16. This IE is used to specify UE autonomous resource selection for NR V2X SL communication when the UE is in IDLE mode or CONNECTED mode.

According to various implementations of the present disclosure, a new mechanism in an NR V2X capable UE and a new operation in the NR V2X resource selection function are provided to leverage physical layer Beam Management configurations in conjunction with one or more SL channels to determine the identity of the optimal beam for establishing an SL connection as instigated from a first UE to a second UE (e.g., for the purpose of ranging direction determination from the first UE to the second UE).

In the 3GPP Rel-18 (S1-202304), a "Ranging" is different than a "Positioning" application in that positioning resolves the location of a device on a standard grid, while a ranging resolves the direction (e.g., Azimuth in a horizontal plane), inclination (e.g. Altitude in the vertical plane) and distance from one device to another. The objective of the SA1 study item is to study the use cases and potential service requirements for services utilizing distance and/or direction. Aspects to be studied include: identifying Use cases and potential requirements of ranging-based services directly between two or more UEs, for example, accuracy of distance and direction, maximum range distance, ranging latency, energy/battery consumption; and gap analysis with existing mechanisms to enable ranging-based services.

According to various implementations of the present disclosure, a direction ranging method uses a direction ranging configuration resource set (hereinafter "resource set") provided by an NR V2X Control Function to configure the physical layer of a direction ranging UE's (e.g., the first UE) SL channels. The NR V2X Control Function may provide to the first UE's direction ranging mechanism a plurality of resource sets, whereby the first (or initial) resource set may be followed by one or more subsequent resource sets and the delivery of a subsequent resource set is dependent upon a determination made by the NR V2X Control Function regarding the results of the direction ranging process per the use of the initial (or previous) resource set.

According to one implementation of the present disclosure, a processor residing in a first UE may determine the relative direction (e.g., Azimuth and Zenith) between the first UE and a second UE via which beam a Beam Management (BM) process has selected for the transmission of NR signals over the SL channel, and relate that beam's orientation to the transmit (Tx) antenna, and relate the Tx antenna's orientation to the handset. In addition, a heading from a first UE to a second UE can then further be determined by relating the first UE's (and its antenna) orientation to a magnetic bearing such as North.

To execute such a method, an NR V2X UE may be preconfigured by a gNB in such a way that its physical layer parameters or information elements determining a given transmission scheme transmit a given number of transmission beams on the NR SL channel where, each beam is centered on a given radial from the Tx antenna, no two beam occupy the same radial, each beam has at a given width, and the configuration is made according to the available V2X frequency.

Furthermore, the NR V2X UE may in a subsequent action as directed by the network reconfigure the physical layer to transmit a different number of transmission beams, and beam widths in a different frequency range, whereby the subsequent reconfiguration is depended upon the results of the previous configuration. For example, following an initial direction determination, the method may further determine that a more accurate direction may be attained by reconfiguring the SL channel to use a different set of Tx beams and beam widths and frequency range.

In NR, there are roughly two large frequency range specified in the 3GPP. One is below 6 GHz, and is what we usually call sub 6 GHz (e.g., FR1). The other is above 6 GHz, and is what we usually call millimeter wave (e.g., FR2). Depending on the frequency ranges, the maximum bandwidth and subcarrier spacing varies. In FR1, the maximum bandwidth is 100 MHz and in the FR2 range the maximum bandwidth is 400 MHz. Some subcarrier spacing (15, 30 KHz) can be used only in FR1 and some subcarrier spacing (120, 240 KHz) can be used in FR2 only, and some subcarrier spacing (60 KHz) can be used both in FR1 and FR2 range.

As mentioned above, two types of frequency range is defined in 3GPP. Sub 6 GHz range is called FR1, and millimeter wave range is called FR2. The exact frequency range for FR1 (sub 6 GHz) and FR2 (millimeter wave) are defined as below.

The definitions of frequency ranges are shown in Table 5.1-1 of the 3GPP 38.101-1.

TABLE 5.1-1

Definition of frequency ranges.

| Frequency range designation | Corresponding frequency range |
|---|---|
| FR1 | 450 MHz-6000 MHz |
| FR2 | 24250 MHz-52600 MHz |

The NR operating bands in FR1 are listed in Table 5.2-1 of the 3GPP 38.101-1.

TABLE 5.2-1

NR operating bands in FR1

| NR Operating Band | Uplink (UL) operating band BS receive UE transmit $F_{UL\_low}$-$F_{UL\_high}$ | total BW | Downlink (DL) operating band BS transmit UE receive $F_{DL\_low}$-$F_{DL\_high}$ | total BW | Duplex Mode |
|---|---|---|---|---|---|
| n1 | 1920 MHz-1980 MHz | 60 | 2110 MHz-2170 MHz | 60 | FDD |
| n2 | 1850 MHz-1910 MHz | 60 | 1930 MHz-1990 MHz | 60 | FDD |
| n3 | 1710 Mhz-1785 MHz | 75 | 1805 MHz-1880 MHz | 75 | FDD |

TABLE 5.2-1-continued

| NR operating bands in FR1 | | | | | |
|---|---|---|---|---|---|
| NR | Uplink (UL) operating band BS receive UE transmit | | Downlink (DL) operating band BS transmit UE receive | | |
| Operating Band | $F_{UL\_low}$-$F_{UL\_high}$ | total BW | $F_{DL\_low}$-$F_{DL\_high}$ | total BW | Duplex Mode |
| n5 | 824-849 MHz | 25 | 869 MHz-894 MHz | 25 | FDD |
| n7 | 2500 MHz-2570 MHz | 70 | 2620 MHz-2690 MHz | 70 | FDD |
| n8 | 880 MHz-915 MHz | 35 | 925 MHZ-960 MHz | 35 | FDD |
| n20 | 832 MHz-862 MHz | 30 | 791 MHZ-821 MHz | 30 | FDD |
| n28 | 703 MHz-748 MHz | 45 | 758 MHz-803 MHz | 45 | FDD |
| n38 | 2570 MHz-2620 MHz | 50 | 2570 MHz-2620 MHz | 50 | TDD |
| n41 | 2496 MHz-2690 MHz | 194 | 2496 MHz-2690 MHz | 194 | TDD |
| n50 | 1432 MHz-1517 MHz | 85 | 1432 MHz-1517 MHz | 85 | TDD |
| n51 | 1427 MHz-1432 MHz | 5 | 1427 MHz-1432 MHz | 5 | TDD |
| n66 | 1710 MHz-1780 MHz | 70 | 2110 MHz-2200 MHz | 90 | FDD |
| n70 | 1695 MHz-1710 MHz | 15 | 1995 MHz-2020 MHz | 25 | FDD |
| n71 | 663 MHz-698 MHz | 35 | 617 MHz-652 MHz | 35 | FDD |
| n74 | 1427 MHz-1470 MHz | 43 | 1475 MHz-1518 MHz | 43 | FDD |
| n75 | N/A | | 1432 Mhz-1517 MHz | 85 | SDL |
| n76 | N/A | | 1427 Mhz-1432 MHz | 5 | SDL |
| n78 | 3300 MHz-3800 MHz | 500 | 3300 MHz-3800 MHz | 500 | TDD |
| n77 | 3300 MHz-4200 MHz | 900 | 3300 MHz-4200 MHz | 900 | TDD |
| n79 | 4400 MHz-5000 MHz | 600 | 4400 MHz-5000 MHz | 600 | TDD |
| n80 | 1710 MHz-1785 MHz | 75 | N/A | | SUL |
| n81 | 880 MHz-915 MHz | 35 | N/A | | SUL |
| n82 | 832 MHz-862 MHz | 30 | N/A | | SUL |
| n83 | 703 MHz-748 MHz | 45 | N/A | | SUL |
| n84 | 1920 MHz-1980 MHz | 60 | N/A | | SUL |

The NR operating bands in FR2 are listed in Table 5.2-1 of the 3GPP 38.101-2.

TABLE 5.2-1

| NR operating bands in FR2 | | | | | |
|---|---|---|---|---|---|
| NR | Uplink (UL) operating band BS receive UE transmit | | Downlink (DL) operating band BS transmit UE receive | | |
| Operating Band | $F_{UL\_low}$-$F_{UL\_high}$ | total BW | $F_{DL\_low}$-$F_{DL\_high}$ | total BW | Duplex Mode |
| n257 | 26500 MHZ-29500 MHz | 3000 | 26500 MHZ-29500 MHz | 3000 | TDD |
| n258 | 24250 MHz-27500 MHz | 3260 | 24250 MHz-27500 MHz | 3260 | TDD |
| n260 | 37000 MHz-40000 MHz | 3000 | 37000 MHz-40000 MHz | 3000 | TDD |

The applicable SS raster entries per operating band (FR1) are listed in Table 5.4.3.3-1 of the 3GPP 38.104 v15.1.0.

TABLE 5.4.3.3-1

| Applicable SS raster entries per operating band (FR1) | | | |
|---|---|---|---|
| NR Operating Band | SS Block SCS | SS Block pattern[1] | Range of GSCN (First-<Step size>-Last) |
| n1 | 15 kHz | Case A | [7039-<1>-7224] |
| n2 | 15 kHz | Case A | [6439-<1>-6624] |
| n3 | 15 kHz | Case A | [6022-<1>-6258] |
| n5 | 15 kHz | Case A | [2902-<1>-2973] |
| | 30 kHz | Case B | [2911-<1>-2964] |
| n7 | 15 kHz | Case A | [8740-<1>-8958] |
| n8 | 15 kHz | Case A | [3091-<1>-3192] |
| n20 | 15 kHz | Case A | [2644-<1>-2727] |
| n28 | 15 kHz | Case A | [2533-<1>-2667] |

TABLE 5.4.3.3-1-continued

| Applicable SS raster entries per operating band (FR1) | | | |
|---|---|---|---|
| NR Operating Band | SS Block SCS | SS Block pattern[1] | Range of GSCN (First-<Step size>-Last) |
| n38 | 15 kHz | Case A | [8572-<1>-8958] |
| n41 | 15 kHz | Case A | [9069]-<TBD>-[9199] |
| | 30 kHz | Case C | [9070-<1>-9198] |
| n50 | 15 kHz | Case A | [4780-<1>-5049] |
| n51 | 15 kHz | Case A | [4762-<1>-4764] |
| n66 | 15 kHz | Case A | [7039-<1>-[7326] |
| | 30 kHz | Case B | [7048-<1>-[7317] |
| n70 | 15 kHz | Case A | [6655-<1>-[6726] |
| n71 | 15 kHz | Case A | [2062-<1>-2166] |
| n74 | 15 kHz | Case A | [4924-<1>-5052] |
| n75 | 15 kHz | Case A | [4780-<1>-5049] |
| n76 | 15 kHz | Case A | [4762-<1>-4764] |
| n77 | 30 kHz | Case C | [9628-<1>-10247] |
| n78 | 30 kHz | Case C | [9628-<1>-9969] |
| n79 | 30 kHz | Case C | [10393]-<TBD>-[10802] |

The applicable SS raster entries per operating band (FR2) are listed in Table 5.4.3.3—of the 3GPP 38.104 v15.1.0.

TABLE 5.4.3.3-2

| Applicable SS raster entries per operating band (FR2) | | | |
|---|---|---|---|
| NR Operating Band | SS Block SCS | SS Block pattern[1] | Range of GSCN (First-<Step size>-Last) |
| n257 | 120 kHz | Case D | [24306-<1>-24476] |
| | 240 kHz | Case E | [24308-<2>-24474] |
| n258 | 120 kHz | Case D | [24175-<1>-24361] |
| | 240 kHz | Case E | [24176-<2>-24360] |
| n260 | 120 kHz | Case D | [24913-<1>-25084] |
| | 240 kHz | Case E | [24916-<2>-25080] |

The millimeter-wave (mmWave) frequencies (higher frequencies in FR2) offer the availability of very wide band-widths, which support the high data rates required by NR. However, mmWave links are highly susceptible to rapid channel variations and suffer from severe free-space path-loss and atmospheric absorption. To address these challenges, the NR base stations and the NR UE will use highly directional Tx antennas to achieve sufficient link budget in wide area networks. The consequence of the directional Tx antennas is the need to transmit multiple narrow/directional beams. In NR, the concept of Beam Management is used in high frequency band (e.g., FR2) to configure and coordinate the multiple narrow/directional transmission beams used by the multi-beam based system (e.g., the configuration and coordination of beams used by a directional multi-beam based communication system).

FIG. 1 illustrates a non-roaming 5G System architecture for V2X communication over PC5 and Uu reference points in the 3GPP 5G TS 23.287. In TS 23.287, it is specified that the PCF (Policy Control Function is defined in TS 23.501) includes the function to provision the UE and AMF (Access and Mobility Management Function) with necessary parameters in order to use V2X communication. The PCF may:

- Determine the V2X Policy/Parameter for specific PC5 RAT to provision to the UE based on the received UE's PC5 Capability for V2X.
- Determine whether to provision V2X Policy/parameters for V2X communication over PC5 reference point and/or V2X communication over Uu reference point to the UE.
- Provision the UEs with authorization and policy parameters for V2X communication over PC5 reference point.
- Provision the UEs with policy parameters for V2X communication over Uu reference point.
- Provision the AMF with PC5 QoS parameters as defined in clause 5.4.2 used by NG-RAN.
- Retrieve V2X parameters from UDR.

FIG. 2 illustrates a 5G System architecture for AF-based service parameter provisioning for V2X communications in the 3GPP TS 23.287.

In FIG. 2, the following are the reference points:

- V1: The reference point between the V2X applications in the UE and in the V2X Application Server. This reference point is out of scope of this specification.
- V5: The reference point between the V2X applications in the UEs. This reference point is not specified in this release of the specification.
- PC5: The reference point between the UEs, and it includes the LTE based PC5 and/or NR based PC5.
- N1: In addition to the relevant functions defined in TS 23.501 [6] for N1, in the case of V2X Service it is also used to convey the V2X policy and parameters (including service authorization) from AMF to UE and to convey the UE's V2X Capability and PC5 Capability for V2X information from UE to AMF.
- N2: In addition to the relevant functions defined in TS 23.501 [6] for N2, in the case of V2X Service it is also used to convey the V2X policy and parameters (including service authorization) from AMF to NG-RAN.
- Uu: The reference point between the UE and the NG-RAN.

In FIG. 2, the following are the service-based interfaces:

- Nudm: In addition to the relevant services defined in TS 23.501 [6] for Nudm, in the case of V2X Service, services provided by UDM are used to get V2X Service related subscription information to AMF during Initial registration procedure or UE Configuration Update (UCU) procedure to inform AMF subscription information has changed.
- Npcf: In addition to the relevant services defined in TS 23.501 [6] for Npcf, in the case of V2X Service, services provided by H-PCF are used to provide V2X Service related parameters to V-PCF for UE and NG-RAN in the roaming case.
- Nudr: In addition to the relevant services defined in TS 23.501 [6] for Nudr, in the case of V2X Service, services provided by UDR are used to notify the PCF and the UDM of the update of the V2X Service related information.
- Nuef: In addition to the relevant services defined in TS 23.501 [6] for Nnef, in the case of V2X Service, services provided by NEF are used by the V2X Application Server to update V2X Service related information of 5GC.
- Namf: In addition to the relevant services defined in TS 23.501 [6] for Namf, in the case of V2X Service, services provided by AMF are consumed by PCF to provide the V2X Service related parameters for the UE and the NG-RAN to AMF, and to enable the AMF create or update UE context related to V2X service.
- Nnrf: In addition to the relevant services defined in TS 23.501 [6] for Nnrf, in the case of V2X Service, services provided by NRF are used to discover the PCF that supports V2X.

In the 3GPP TS 23.287, it is specified that the V2X Application Server (V2X AS) includes AF (Application Function) functionality, and may support at least the following capabilities:

For V2X service handling:

- Receive uplink data from the UE over unicast.
- Send downlink data to the UE over unicast.
- Request QoS Sustainability Analytics for potential supportable QoS changes in a geographic area from NWDAF via NEF.

For V2X service parameters provisioning,

- Provision the 5GC with parameters for V2X communications over PC5 and Uu reference points.
- Provision the UE with parameters for V2X communications over PC5 reference point and/or Uu reference point.

NOTE: The V2X Application Servers for V2X services handling and V2X service parameter provisioning can be the same or different.

In the 3GPP TS 23.287, it is specified that the AMF (Access and Mobility Management Function is defined in TS 23.501) functions defined in TS 23.501 performs the following functions:

- Obtain from UDM the subscription information related to V2X and store them as part of the UE context data.
- Select a PCF supporting V2X Policy/Parameter provisioning and report the PC5 Capability for V2X to the selected PCF.
- Obtain from PCF the PC5 QoS information related to V2X and store it as part of the UE context data.
- Provision the NG-RAN with indication about the UE authorization status about V2X communication over PC5 reference point.
- Provision the NG-RAN with PC5 QoS parameters related to V2X communication.

In the 3GPP TS 23.287, it is specified the UDM (Unified Data Management, defined in TS 23.501) performs the following functions:

Subscription management for V2X communication over PC5 reference point.

In the 3GPP TS 23.287, it is specified the UDR (Unified Data Repository, defined in TS 23.501) performs the following functions:

Stores V2X service parameters.

In the 3GPP 5G TS 23.287, it is specified the NRF (Network Repository Function defined in TS 23.501) performs the following functions:

PCF discovery by considering V2X capability.

Thus, the PCF, AMF, V2X AS, UDM, UDR, NRF (aka the "NR V2X Control Function" as when taken together in this disclosure) are the logical functions that are used for network related actions required for NR V2X, and that the NR V2X Control Function is used to provision the UE with necessary parameters that enable the UE to use V2X communication. Thus, for NR V2X, it is expected that NR V2X Control Function will determine the set of RF transmission resources, and BM configurations for the resource, to be used by the SL channel in support a Ranging-based operation for the determination of the relative direction between two UEs.

In one or more implementations of the present application, the UE may have hardware or a processor that executes a method that provides for the NR V2X UE to inform the NR V2X Control Function that the UE is capable of executing operations for the purpose of assisting the NR V2X Control Function in determining the relative direction between two UE's using SL communication channel and Beam Management. In addition the method provides for the NR V2X UE to inform the NR V2X Control Function about specific default values for relating the orientation of the UE's antenna array axis and antenna transmission beam to a default direction in a default reference plane (e.g., a value that equates that 0 deg in the horizontal plane would equate to a beam that radiates out the top of the device) and default value for antenna attributes (e.g., the number of antenna array elements).

In one or more implementations of the present application, the network may have hardware or a processor that executes a method that provides for the NR V2X Control Function to configure the NR V2X UE with a set of resources that enable the UE to execute an operation for the beam selection and beam identification aspect of the directional determination. The set of resources provided by the NR V2X Control Function includes a set of NR V2X Resource Pools parameters, a set of BM configurations for those V2X resources and a resource set unique ID. The resource set provided by NR V2X Control Function enable the NR V2X UE to configure the physical layer to generate a specific set of directional Tx beams when using the NR V2X RF transmission resources, and each directional Tx beam can be uniquely identified (i.e., a Beam Index).

The method of the NR V2X Control Function can configure the NR V2X UE with an initial and subsequent sets of resources, whereby each resource set can be identified by a unique identifier.

Figure 3A:
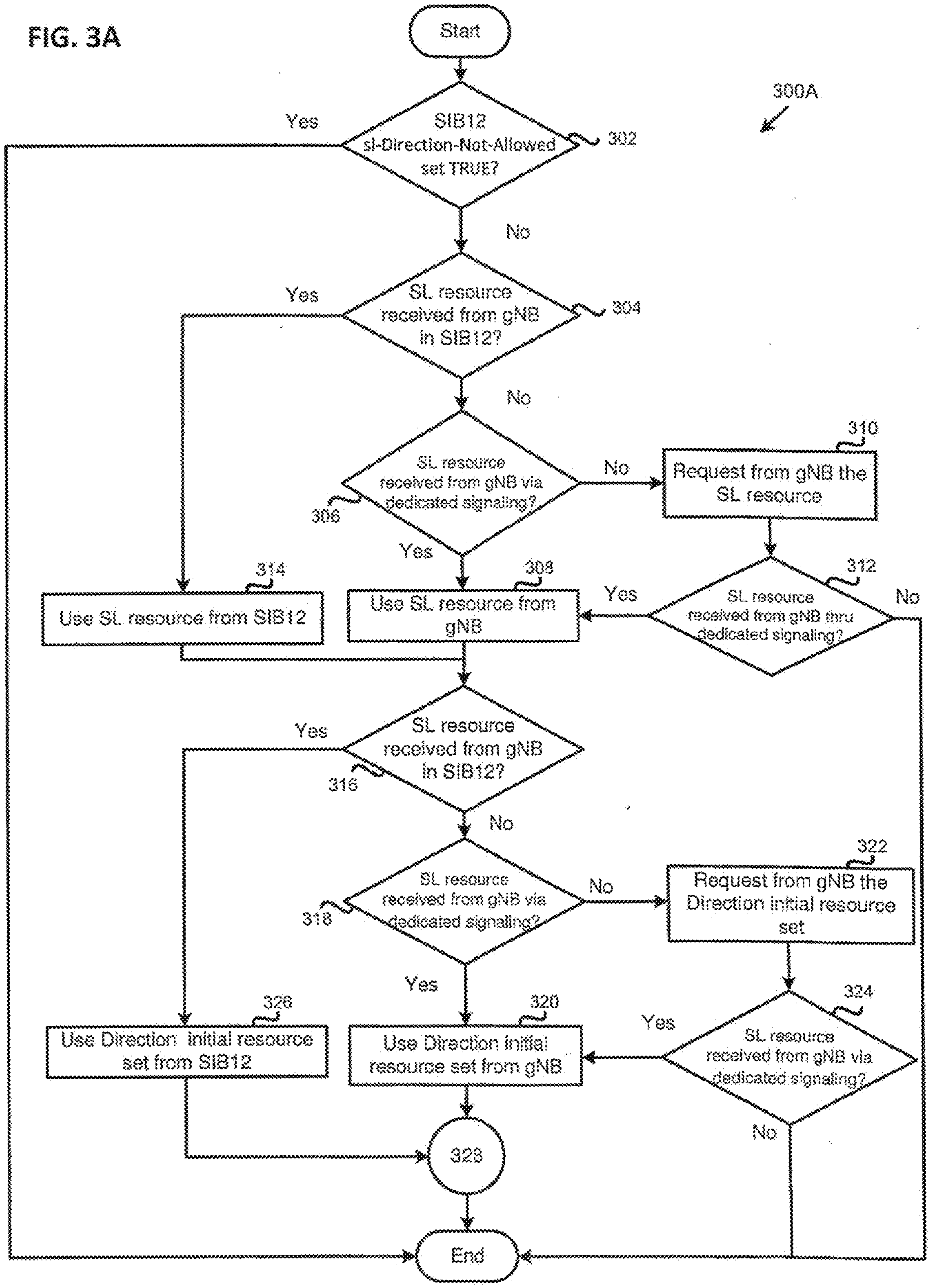
FIG. 3A illustrate flowchart of a direction ranging method by a first UE for determining a relative direction from the first UE to a second UE in accordance with an example implementation of the present application.
Figure 3B:
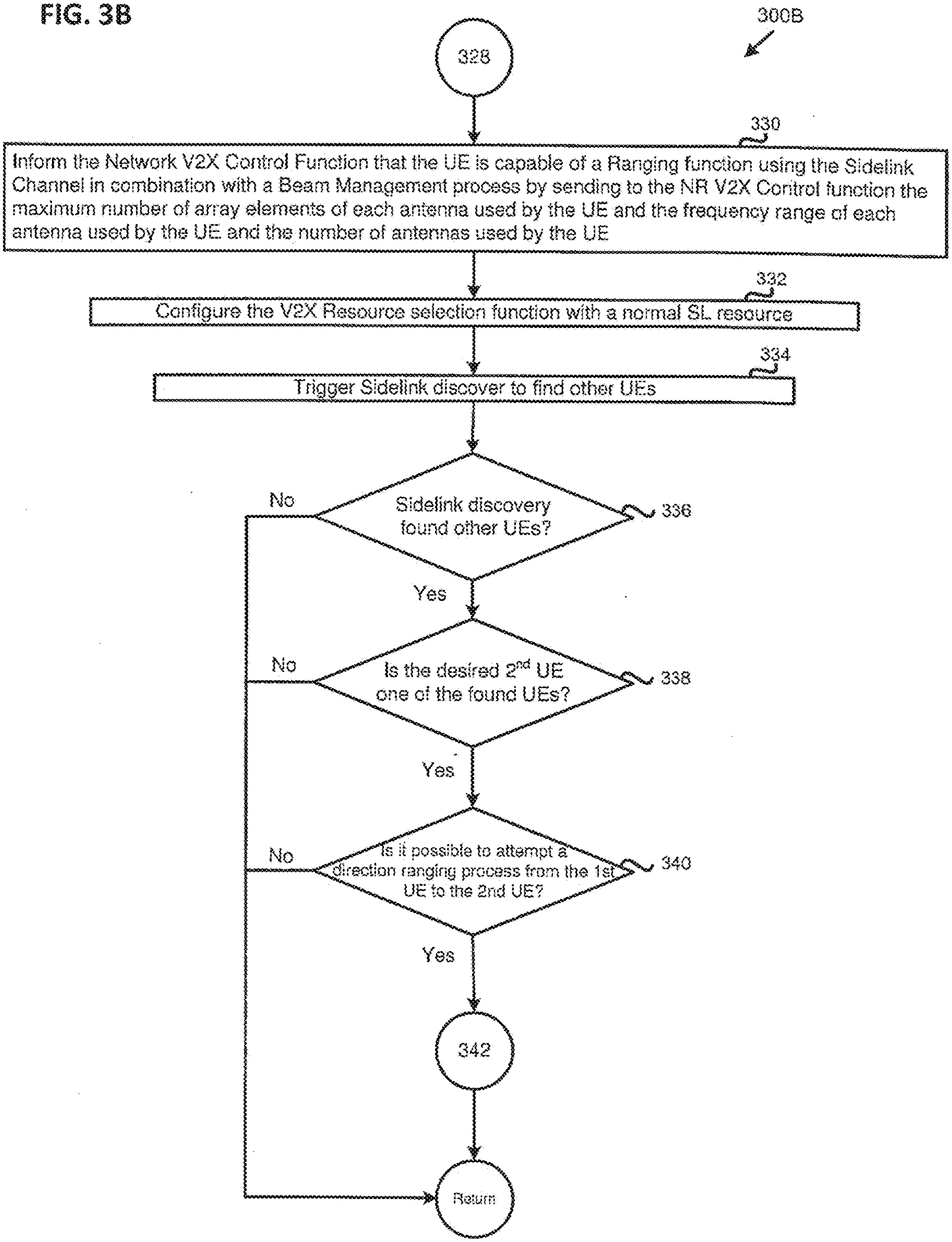
FIG. 3B illustrate flowchart of a direction ranging method by a first UE for determining a relative direction from the first UE to a second UE in accordance with an example implementation of the present application.
Figure 3C:
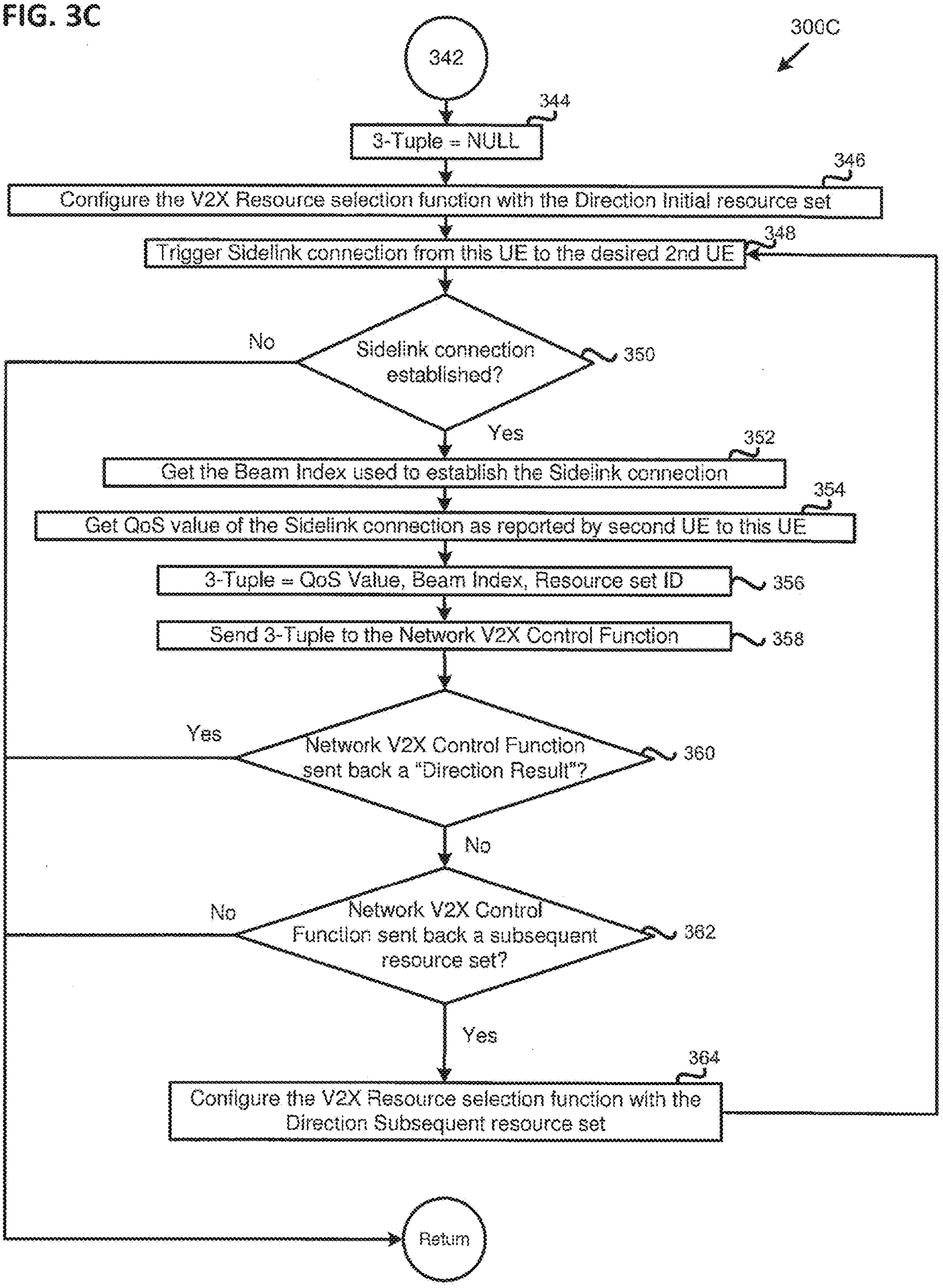
FIG. 3C illustrate flowchart of a direction ranging method by a first UE for determining a relative direction from the first UE to a second UE in accordance with an example implementation of the present application.

FIGS. 3A, 3B, and 3C illustrate a flowchart of a direction ranging method by a first UE (e.g., an NR UE) for determining a relative direction from the first UE to a second UE (e.g., another NR UE) in accordance with an example implementation of the present application.

In one or more implementations of the present disclosure, the direction ranging method uses a direction ranging configuration resource set (hereinafter "resource set") provided by a Network V2X Control Function (e.g., an NR V2X Control Function) to configure the physical layer of a direction ranging UE's (e.g., the first UE) SL channel. The NR V2X Control Function may provide to the first UE's direction ranging mechanism a plurality of resource sets, whereby the first (or initial) resource set may be followed by one or more subsequent resource sets and the delivery of a subsequent resource set is dependent upon a determination made by the NR V2X Control Function regarding the results of the direction ranging process per the use of the initial (or previous) resource set.

The direction ranging method may begin by the first UE informing the NR V2X Control Function about the capabilities of the first UE with respect to the first UE's ability to support a ranging procedure and providing to the NR V2X Control Function the default values describing how the first UE UE's antennas are configured with respect to their orientation to the UE's display.

In FIG. 3A, in action 302 of the flowchart 300A, the first UE determines whether a directional ranging bit is configured in a System Information Block 12 (SIB12) broadcast by a base station (e.g., a gNB) to enable the first UE to use a preconfigured initial resource set for SL direction operation. For example, when an "sl-Direction-Not-Allowed" bit in the SIB12 is set to be TRUE, then the first UE is not allowed to perform SL direction operations. Thus, the direction ranging method ends. When the "sl-Direction-Not-Allowed" bit in the SIB12 is set to be FALSE, then the first UE is allowed to perform SL direction operations and the flowchart 300A proceeds to action 304.

In action 304, the first UE determines whether any SL resources are received from the base station (e.g., a gNB) in the SIB12. If at least one SL resource is received from the base station in the SIB12, the flowchart proceeds to action 314 where the first UE will use the SL resource indicated in the SIB12 for the subsequent actions. In one implementation, the base station may provide the SL resource via information elements SL-DirConfigCommon-r17 carried by the SIB12 broadcast by the base station. On the other hand, if no SL resource is received from the SIB12, the flowchart 300A proceeds to action 306.

In action 306, the first UE determines whether any SL resources are received from the base station via dedicated signaling. If at least one SL resource is received from the base station via dedicated signaling (e.g., via an RRCReconfiguration message), the flowchart 300A proceeds to action 308 where the first UE will use the SL resource received from the base station for the subsequent actions. In one implementation, the base station may provide the SL resource via information elements SL-DirConfigDedicated-r17 carried by a Radio Resource Control (RRC) reconfiguration (RRCReconfiguration) message. On the other hand, if no SL resource is received from the base station via dedicated signaling, the flowchart 300A proceeds to action 310.

In action 310, the first UE requests SL resources from the base station via dedicated signaling. In action 312, after making the request, the first UE determines whether any SL resources are received from the base station via dedicated signaling (e.g., an RRC message). If at least one SL resource is received from the base station via dedicated signaling, the flowchart 300A proceeds to action 308 where the first UE will use the SL resource indicated in the dedicated signaling for the subsequent actions. If no SL resource is received from the base station in action 312, then the direction ranging method ends. In one implementation, the base station may provide the SL resource via information elements SL-DirConfigDedicated-r17 carried by an RRCReconfiguration message.

In action 316, the first UE determines whether an initial resource set (e.g., a Direction initial resource set) is received from the base station in the SIB12. If an initial resource set is received in the SIB12, then the flowchart proceeds to action 326 where the first UE uses the initial resource set from SIB12 for the subsequent actions. If a direction initial resource set is not received in the SIB12, then the flowchart proceeds to action 318.

In action 318, the first UE determines whether an initial resource set is received from the base station. If an initial resource set is received from the base station, then the flowchart proceeds to action 320 where the first UE uses the initial resource set from the base station for the subsequent actions. If an initial resource set is not received from the base station, then the flowchart proceeds to action 322.

In action 322, the first UE requests an initial resource set from the base station via dedicated signaling.

In action 324, after making the request, the first UE determines whether an initial resource set is received from the base station via dedicated signaling (e.g., an RRC message). If an initial resource set is received from the base station via dedicated signaling, then the flowchart proceeds to action 320 where the first UE will use the initial resource set from the base station for the subsequent actions. In one implementation, the base station may provide the SL resource via information elements SL-DirConfigDedicated-r17 carried by an RRCReconfiguration message. If an initial resource set is not received from the base station in action 324, then the direction ranging method ends.

In various implementations of the present disclosure, the Network V2X Control Function provides to the first UE a set of NR SL resources and Beam Management parameters for use in determining a direction from the first UE to the second UE. The NR SL resources and Beam Management parameters provided by the Network V2X Control Function are aggregated into a logical grouping called a "Direction resource set" or "resource set". Associated with each resource set are: a unique identifier (ID) of the Direction resource set, parameters enabling a specific set of directional Tx beams, a unique index for each directional Tx beam, parameters for configuring an NR V2X Resource Pool. The Network V2X Control Function may provide the first UE with a plurality of resource sets. In various implementations of the present disclosure, the first UE may trigger an initial configuration of the SL physical layer with an initial resource set, and then any determined reconfiguring of the physical layer with one or more subsequent resource sets. FIG. 4 illustrates contents of example resource sets configured by the Network V2X Control Function.

Upon receiving the initial resource set (either via SIB12 in action 326 or via dedicated signaling in action 320), the direction ranging method proceeds to action 328 in the flowchart 300B in FIG. 3B.

Referring to FIG. 3B, in action 330, the first UE may inform the Network V2X Control Function that the first UE is capable of a Ranging function using the SL channel in combination with a Beam Management process. For example, the first UE may provide to the NR V2X Control Function, an indication that the first UE is capable of a ranging function using an SL channel in combination with a BM process, the Ranging function resolving a direction and an inclination from the first UE to the second UE. The indication may include the maximum number of array elements of each antenna used by the first UE, the frequency range of each antenna used by the first UE, and the number of antennas used by the first UE.

In action 332, the first UE may configure the V2X resource selection function with a normal SL resource. In action 334, the first UE may trigger an SL discovery to find other UEs. In action 336, the first UE determines whether the SL discovery found other UEs. If the SL discovery found other UEs in action 336, the flowchart 300B proceeds to action 338. In action 338, the first UE determines whether the desired second UE is one of the other UEs found during the SL discovery. If the SL discovery did not find any other UEs in action 336, the flowchart 300B proceeds to return to the flowchart 300A and the direction ranging method ends.

In action 338, if the desired second UE is one of the other UEs found during the SL discovery, then the flowchart 300B proceeds to action 340. If the desired second UE is not one of the other UEs found during the SL discovery, then the flowchart 300B proceeds to return to the flowchart 300A and the direction ranging method ends.

In action 340, the first UE determines whether it is possible to attempt a direction ranging process from the first UE to the second UE. For example, the first UE may attempt to establish an SL connection to the second UE using a standard SL configuration so as to determine if a ranging process is possible and/or desired. If it is possible to attempt a direction ranging process from the first UE to the second UE, then the flowchart 300B proceeds to action 342 in the flowchart 300C in FIG. 3C to establish an SL connection from the first UE to the second UE using the initial Direction ranging configuration resource set. If it is not possible to attempt a direction ranging process from the first UE to the second UE, then the flowchart 300B proceeds to return to the flowchart 300A and the direction ranging method ends.

Referring to FIG. 3C, a 3-Tuple of [Resource set unique ID, Beam Index, QoS] is set to be NULL in action 344.

In action 346, the first UE configures the V2X Resource selection function with the initial resource set. For example, the first UE may configure an SL communication channel with the initial resource set having the V2X resource pools and associated BM configurations.

In action 348, the first UE triggers an SL connection from the first UE to the second UE. For example, the first UE may attempt to establish an SL communication link with the second UE via the configurations provided by the initial resource set.

The first UE may map each of the set of directional transmission beams used for establishing the SL connection to a beam index. Each Beam Index of the initial resource set represents a specific Tx beam, where each Tx beam radiates from an antenna in a specific direction. The direction of a Tx beam may be mapped to a horizontal plane as a plane of reference that is centered on the first UE's transmitting antenna, whereby each Tx beam may be associated with a azimuth in degrees (or radians or grads.), and the azimuths represent an angle from zero to 359 degrees in the reference plane that is oriented 90 degrees to the antenna as a di-pole (e.g., each azimuth represents bearings in a horizontal plane of reference (the X-Y plane) relative to the antenna's Z-axis). A beam's azimuth is assigned such that there is a relationship to the physical orientation of the antenna in the first UE.

Additionally, each Tx beam may be associated with a zenith angle in degrees (or radians or grads.) that are centered on the first UE's transmitting antenna, and the zenith angle may range from 0-180 degrees (i.e., the zenith represents a bearing in a vertical plane of reference, where 0 degrees is vertically up, 90 degrees is horizontal, and 180 degrees is vertically down). Alternately, an altitude angle in degrees (or radians or grads.) from +90 to −90 degrees can be used that spans from vertically up to vertically down. The plane of the zenith bisects the plane of the azimuth and shares the same origin as the azimuth, such that a zenith is aligned, and related, to an azimuth.

In one implementation of the present disclosure, only the azimuth is considered. If the first UE is oriented such that its user interface (UI) display is in the horizontal plane, a first beam may be assigned an azimuth such that it relates to a bearing out of the top of the UE (e.g., 0 degrees), a second beam may be assigned to an azimuth such that it relates to a bearing out the right side of the first UE (e.g., 90 degrees), a third beam may be assigned to an azimuth such that it relates to a bearing out the bottom (e.g., 180 degrees), a fourth beam may be assigned to an azimuth such that it relates to a bearing out the left side (e.g., 270 degrees).

In another implementation of the present disclosure, zenith and azimuth are considered. A first beam may be assigned zenith of 30 degrees and is aligned to an azimuth of 0 degrees, a second beam may be assigned an zenith that relates to 90 degrees and is aligned to an azimuth 90 degrees, a third beam may be assigned an zenith that relates to 120 degrees and is aligned to an azimuth of 180 degrees, a fourth beam may be assigned a zenith that relates to 90 degrees and is aligned to an azimuth of 270 degrees.

In various implementations of the present disclosure, the relationship that maps azimuth and zenith to an antenna's physical or electronic orientation on a UE is known to the Network V2X Control Function and the UEs application layer. The number of beams is dependent on the configuration.

In various implementations of the present disclosure, the physical mounting of the antenna in the first UE can be associated to default reference planes. The default value many have been configured at time of manufacture, or the default values may be an electronic interpretation of the antenna's orientation relative the first UE's body that is computed by the microcontroller on the first UE. For example, the antenna could be mounted such that the antenna's electronic X-Y plane is in the same reference plane as the screen (e.g., front and back side) of the first UE, and the antenna's electronic X-Z plane is in the same reference plane as the top and bottom of the first UE, and the antenna's electronic Z-Y plane is in the same reference plane as the left and right side of the first UE.

It can be envisioned that the NR V2X enabled UE will have embedded in its hardware a 2-axis orientation sensor capable of continuously measuring: pitch (rotation about the X-axis), and roll (rotation about the Y-axis).

Figure 5:
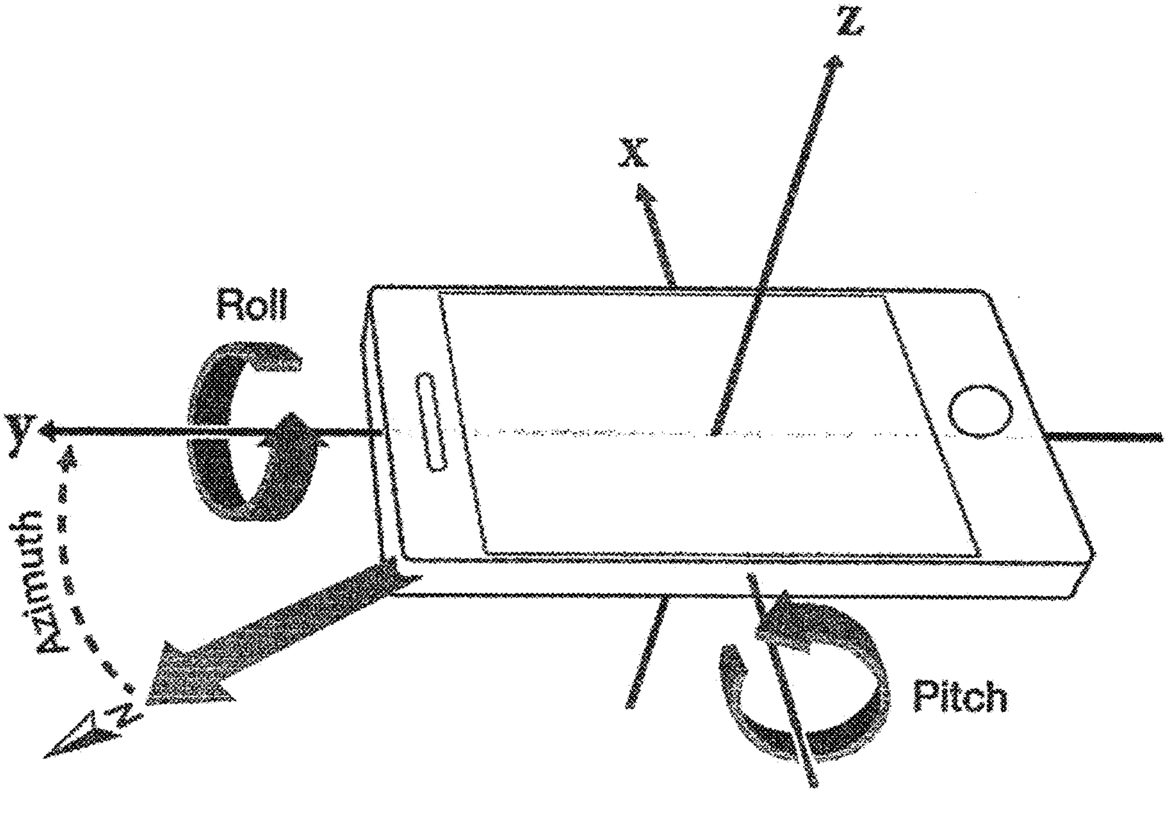
FIG. 5 illustrates an example of an orientation of a handset body in relation to X, Y and Z axis and their relationship front, top and side, and the relationship to Pitch, Roll and Yaw, in accordance with implementations of the present disclosure.

In various implementations of the present disclosure, the first UE is an NR V2X enabled UE that has embedded in its hardware a compass for detecting magnetic North (e.g., a Flux-gate compass), which can be used to measure the yaw (rotation about the Z-axis) of the handset relative to some point indicated by the compass (e.g., the azimuth from magnetic North). FIG. 5 illustrates an example of an orientation of the handset body in relation to X, Y and Z axis and their relationship front, top and side, and the relationship to Pitch, Roll and Yaw.

In various implementations of the present disclosure, the first UE is capable of assisting the Network V2X Control Function in determining the relative direction between the first UE and the second UE using SL communication channel and Beam Management.

The first UE has specific default values for each of its antennas that can be used for direction determination:

- a maximum number of array elements of each antenna used by the first UE;
- a frequency range of each antenna used by the first UE;
- a number of antennas used by the first UE;
- orientation of an antenna array axis and antenna transmission centered to a default direction in the horizontal plane of reference (e.g., a value that equates to 0 degrees in the horizontal plane would equate to a beam that radiates out the top of the device);
- orientation of an antenna array axis and antenna transmission centered to a default direction in the vertical plane of reference.

FIG. 6 illustrates an example of a UE capability indication in accordance with an implementation of the present disclosure.

In action 350, the first UE determines whether an SL connection from the first UE to the second UE is established. If an SL connection from the first UE to the second UE is established, then the flowchart 300C proceeds to action 352. If an SL connection from the first UE to the second UE is not established, the flowchart 300C proceeds to return to action 342 in FIG. 3B.

In action 352, the first UE determines the beam index identifying the beam of the first set of directional transmission beams the second UE has chosen to establish the SL connection.

The second UE may provide to the first UE information (e.g., an indication) that can assist the first UE to identify the specific beam the second UE has chosen to establish the SL connection (from a plurality of beams transmitted by the first UE and received by the second UE). In one implementation, the second UE may provide such information via a PRACH procedure (e.g., the PRACH location in time identifies the beam that the second UE used to establish the connection to the first UE).

In action 354, the first UE receives a Quality of Service (QoS) value associated with the first beam of the first set of directional transmission beams used for establishing the first SL connection. For example, the second UE may report to the first UE information about the radio frequency (RF) state of the direction determination SL connection between the first UE and the second UE (e.g., the QoS value of the specific beam as received by the second UE) via the PRACH procedure. It should be understood that, in various implementations of the present disclosure, the QoS value associated with the beam chosen by the second UE may be generated based on at least the QoS Sustainability Analytics, which may include radio channel measurements and/or conditions, such as RSRQ (Reference Signal Received Quality), RSRP (Reference Signal Received Power), CQI (Channel Quality Indicator), and other analytics such as frame error rate.

In action 356, the first UE configures the 3-Tuple of [Resource set unique ID, Beam Index, QoS], where the "resource set unique ID" is the ID of the resource set used to establish the SL connection, the "beam index" is the beam chosen by the second UE to establish the SL connection with the first UE, and the "QoS" is the QoS value associated with the chosen beam.

In action 358, the first UE sends the 3-Tuple to the Network V2X Control Function. For example, the first UE may report the results of the beam selection, the resource set used, and the QoS value of the selected beam to the Network V2X Control Function via the 3-tuple of [Resource set unique ID, Beam Index, QoS].

The Network V2X Control Function may then make a direction determination from the first UE to the second UE based on the first UE's capabilities (e.g., antenna configuration and antenna array elements and default values for relating its antenna array orientation and antenna transmissions to a default direction in a default reference plane), the unique ID of the resource set used by the first UE to generate the beam, the unique index of the beam used to establish the SL connection, and the QoS of the beam as received by the second UE.

In action 360, the first UE determines whether the Network V2X Control Function sent back a "Direction Result". The NR V2X Control Function may either return to the first UE a direction to the second UE (i.e., the Direction Result), or another direction ranging configuration that the first UE will use to do a subsequent direction ranging operation with the second UE.

If the Network V2X Control Function sent back the "Direction Result", then the flowchart 300C proceeds to return to action 342 in FIG. 3B. If the Network V2X Control Function did not send back a "Direction Result", then the flowchart 300C proceeds to action 362.

For example, based on the results of the initial directional determination operation, the Network V2X Control Function may make a determination on the beam used to establish the SL connection is an optimal beam for SL communication from the first UE to the second UE (e.g., for the purpose of ranging direction determination from the first UE to the second UE). If the beam is determined to be optimal, the Network V2X Control Function provides a "Direction Result" to the first UE, indicating to the first UE that additional directional determination operation is not necessary.

In action 362, the first UE determines whether the Network V2X Control Function sent back a subsequent resource set. For example, if the Network V2X Control Function determines that the beam used to establish the SL connection is not an optimal beam for SL communication from the first UE to the second UE (e.g., for the purpose of ranging direction determination from the first UE to the second UE), the Network V2X Control Function may configure a subsequent resource set to the first UE for establish another SL connection from the first UE to the second UE. If the Network V2X Control Function sent back a subsequent resource set, then the flowchart 300C proceeds to action 364. If the Network V2X Control Function did not send back a subsequent resource set, then the flowchart 300C proceeds to return to action 342 in FIG. 3B.

In action 364, the first UE configures the V2X Resource selection function with the direction subsequent resource set to continue the directional determination operations by using the subsequent resource set provided by the Network V2X Control Function. As shown in FIG. 3C, the flowchart 300C proceeds from action 364 back to action 348 to trigger another SL connection from the first UE to the second UE. The first UE may report the results of the subsequent beam selection, the resource set used, and a QoS value to the NR V2X Control Function.

With reference to the flowchart 300C in FIG. 3C, the following description includes an example process in which an initial directional determination operation is followed by an additional iteration of the directional determination operation by the first UE in determining a direction from the first UE to the second UE.

In action 348, the first UE establishes a first SL connection from the first UE to the second UE using a first resource set, the first resource set being the initial Direction resource set provided by an NR V2X Control Function. The first resource set includes an identifier (ID) of the first resource set, parameters for configuring a first V2X Resource Pool, and Beam Management (BM) parameters associated with the first V2X Resource Pool for enabling a first set of directional transmission beams.

In action 352, the first UE determines a first beam of the first set of directional transmission beams the second UE has chosen to establish the first SL connection. The first UE may identify the first beam by an index of the first beam. For example, the first beam index identifies the first beam of the first set of directional transmission beams the second UE has chosen to establish the first SL connection.

In action 354, the first UE receives, from the second UE, a QoS value associated with the first beam of the first set of directional transmission beams used for establishing the first SL connection. In one implementation, the QoS value associated with the first beam is provided by the another UE to the UE via a PC5 Radio Resource Control (RRC) message MeasurementReportSidelink.

In action 358, the first UE reports, to the NR V2X Control Function, the 3-Tuple having the ID of the first resource set, the first beam index identifying the first beam, and the QoS value associated with the first beam. The first UE may also provide, to the NR V2X Control Function, a first indication that the first UE is capable of a ranging function using an SL channel in combination with a BM process, the ranging function resolving a direction and an inclination from the first UE to the second UE. The first indication includes a maximum number of array elements of each antenna used by the first UE, a frequency range of each antenna used by the first UE, and a number of antennas used by the first UE.

The NR V2X Control Function makes a ranging direction determination from the first UE to the second UE based on the first indication from the first UE, the QoS value associated with the first beam, the first beam index, and the ID of the first resource set. For example, during the ranging direction determination, the NR V2X Control Function determines whether the first beam is an optimal beam for SL communication from the first UE to the second UE.

For example, the NR V2X Control Function determines that the first beam is not the optimal beam for SL communication from the first UE to the second UE, when it is determined that further beam refinement may improve the SL communication from the first UE to the second UE. Otherwise, the NR V2X Control Function may provide a Direction Result to the first UE to terminate the directional determination operations.

When the NR V2X Control Function determines that the first beam is not the optimal beam for SL communication from the first UE to the second UE, the NR V2X Control Function configures a second resource set to the first UE (e.g., in action 362) to establish a second SL connection the first UE to the second UE. The second resource set include an ID of the second resource set, parameters for configuring a second V2X Resource Pool, and BM parameters associated with the second V2X Resource Pool for enabling a second set of directional transmission beams. The first UE then establishes the second SL connection from the first UE to the second UE (e.g., in action 348) using the second resource set.

In action 352, the first UE determines a second beam of the second set of directional transmission beams the second UE has chosen to establish the second SL connection. The first UE may identify the second beam by an index of the second beam. For example, the second beam index identifies the second beam of the second set of directional transmission beams the second UE has chosen to establish the second SL connection.

In action 354, the first UE receives, from the second UE, a QoS value associated with the second beam of the second set of directional transmission beams used for establishing the second SL connection. In one implementation, the QoS value associated with the second beam is provided by the second UE to the first UE via a PC5 Radio Resource Control (RRC) message MeasurementReportSidelink.

In action 358, the first UE reports, to the NR V2X Control Function, the 3-Tuple having the ID of the second resource set, the second beam index identifying the second beam, and the QoS value associated with the second beam. The first UE may also provide, to the NR V2X Control Function, a second indication that the first UE is capable of a ranging function using an SL channel in combination with a BM process, the ranging function resolving a direction and an inclination from the first UE to the second UE. The second indication includes a maximum number of array elements of each antenna used by the first UE, a frequency range of each antenna used by the first UE, and a number of antennas used by the first UE.

The NR V2X Control Function makes a second ranging direction determination from the first UE to the second UE based on the second indication from the first UE, the QoS value associated with the second beam, the second beam index, and the ID of the second resource set. For example, during the second ranging direction determination, the NR V2X Control Function determines whether the second beam is an optimal beam for SL communication from the first UE to the second UE.

When the NR V2X Control Function determines that the second beam is not the optimal beam for SL communication from the first UE to the second UE, the NR V2X Control Function may configure a third resource set to the first UE to establish a third SL connection the first UE to the second UE for another iteration of actions 364 through 362 in the flowchart 300C. Otherwise, the NR V2X Control Function may provide a Direction Result to the first UE to terminate the directional determination operations.

FIG. 7 illustrates an example of a new NR SIB12 in accordance with an implementation of the present disclosure.

FIG. 8 illustrates an example of a new RRC Reconfiguration (RRCReconfiguration) message in accordance with an implementation of the present disclosure.

FIG. 9 illustrates an example of a new Sidelink UE Information NR (SidelinkUEInformationNR) message in accordance with an implementation of the present disclosure.

The following example describes what the NR V2X UE may do upon reception of an NR SIB12 with a new IE sl-DirectionConfigCommonNR-r17, as an addition to the existing text in the 3GPP TS 38.331.

Upon receiving SIB12, the UE shall:

---

1>if the UE has stored at least one segment of SIB12 and the value tag of SIB12 has changed since a previous segment was stored:
  2>discard all stored segments;
1>store the segment;
1>if all segments have been received:
  2>assemble SIB12-IEs from the received segments;
  2>if sl-FreqInfoList is included in sl-ConfigCommonNR:
    3>if configured to receive NR sidelink communication:
      4>use the resource pool(s) indicated by sl-RxPool for NR sidelink communication reception, as specified in 5.8.7;
    3>if configured to transmit NR sidelink communication:
      4>use the resource pool(s) indicated by sl-TxPoolSelectedNormal, or sl-TxPoolExceptional for NR sidelink communication transmission, as specified in 5.8.8;
      4>perform CBR measurement on the transmission resource pool(s) indicated by sl-TxPoolSelectedNormal and sl-TxPoolExceptional for NR sidelink communication transmission, as specified in 5.5.3.1;
      34> use the synchronization configuration parameters for NR sidelink communication on frequencies included in sl-FreqInfoList, as specified in 5.8.5;
  2>if sl-RadioBearerConfigList or sl-RLC-BearerConfigList is included in sl-ConfigCommonNR:
    3>perform sidelink DRB reconfiguration as specified in 5.8.9.1a;
2> if sl-MeasConfigCommon is included in sl-ConfigCommonNR:
  3> store the NR sidelink measurement configuration.
2> if sl-Direction-Not-Allowed is set FALSE in SIB12-IEs-r16
    3> if sl-DirectionConfigCommonNR-r17 is included in SIB12-IEs-r16:
      4>if sl-FreqInfoList is included in sl-ConfigCommonNR-r16 in sl-DirectionConfigCommonNR-r17:
        5> if configured to transmit NR sidelink communication:
      5> store the IE sl-DirectionConfigCommonNR-r17 (e.g., for later use by the SL Direction Determination Method).

---

The following example describes what the NR V2X UE may do upon reception of a NR RRCReconfiguration message with a new IE sl-DirectionConfigCommonNR-r17, as an addition to the existing text in the 3GPP TS38.331.

The UE shall perform the following actions upon reception of the RRCReconfiguration, or upon execution of the conditional reconfiguration (CHO or CPC):

```
  1> if the RRCReconfiguration is applied due to a conditional reconfiguration
     execution upon cell selection while timer T311 is running, as defined in
     5.3.7.3:
     2> remove all the entries within VarConditionalReconfig, if any;
[...]
  1> if sl-DirectionConfigDedicatedNR-r17 is included in
     RRCReconfiguration:
     2> if sl-FreqInfoList is included in sl-ConfigCommonNR-r16 in
     sl-DirectionConfigDedicatedNR-r17:
        3> if configured to transmit NR sidelink communication:
          4>use the resource pool(s) indicated by
            sl-TxPoolSelectedNormal, or sl-TxPoolExceptional for NR
            sidelink communication transmission, as specified in 5.8.8;
          4>perform CBR measurement on the transmission resource
            pool(s) indicated by sl-TxPoolSelectedNormal and
            sl-TxPoolExceptional for NR sidelink communication
            transmission, as specified in 5.5.3.1;
          4>use the synchronization configuration parameters for NR
            sidelink communication on frequencies included in
            sl-FreqInfoList, as specified in 5.8.5;
[...].
```

The following example describes what the NR V2X UE may do upon preparing to transmit the SidelinkUEInformationNR message with a new IE UE-TxAntennaParamList-R17, and SL-DirDetrminationResult-r17 as an addition to the existing text in the 3GPP TS38.331.

The UE shall set the contents of the SidelinkUEInformationNR message as follows:

```
  1> if the UE initiates the procedure to indicate it is (no more) interested to
     receive NR sidelink communication or to request (configuration/ release) of
     NR sidelink communication transmission resources or to report to the
     network that a sidelink radio link failure or sidelink RRC reconfiguration
     failure has been declared (i.e., UE includes all concerned information,
     irrespective of what triggered the procedure):
    2>if SIB12 including sl-ConfigCommonNR is provided by the PCell:
      3>if configured by upper layers to receive NR sidelink communication:
        4>include sl-RxInterestedFreqList and set it to the frequency for NR
          sidelink communication reception;
      3>if configured by upper layers to transmit NR sidelink
        communication:
        4>include UE-TxAntennaParamList-R17 and set its fields (if
          needed)
        4> include SL-DirDetrminationResult-r17 and set its fields (if
          needed)
[...].
```

In various implementations of the present disclosure, the new information elements SL-DirConfigCommon-r17 are carried by an SIB12. Those information elements are generated by the network's NR V2X Control Function. The new information elements in the SIB12 may include a single set of the following resource configuration data:

- Parameters for configuring a NR V2X Resource Pool;
- Beam Management parameters associated NR V2X Resource Pool;
- A unique ID associated with the set of NR V2X Resource Pool and Beam Management parameters and QoS threshold, which is always set to 1.

In various implementations of the present disclosure, the new information elements SL-DirConfigDedicated-r17 are carried by an RRCReconfiguration message. Those information elements are generated by the network's NR V2X Control Function. The new information elements RRCReconfiguration may include multiple sets of the following resource configuration data:

- Parameters for configuring a NR V2X Resource Pool;
- Beam Management parameters associated NR V2X Resource Pool;
- A unique ID associated with the set of NR V2X Resource Pool and Beam Management parameters and QoS threshold, which is between 2 and the maximum number of resource configuration sets, and thus does not re-use the identification of the resource set provided by SIB12.

In various implementations of the present disclosure, a new mechanism takes as input from the network's NR V2X Control Function a plurality of resource sets that provides for the configuration of the physical layer SL channel, where each resource set contains at least: a unique identifier for the resource set, parameters for configuring a NR V2X Resource Pool, parameters enabling a specific set of directional Tx beams.

In various implementations of the present disclosure, a Rel-17 NR UE includes a new mechanism that provides as input to the network's NR V2X Control Function an indication that the UE is capable of a Ranging function using the Sidelink channel in combination with a Beam Management process. The input to the NR V2X Control Function may include the maximum number of array elements of each antenna used by the UE and the frequency range of each antenna used by the UE and the number of antennas used by the UE.

In various implementations of the present disclosure, a Rel-17 NR UE includes a new mechanism that is capable of providing to the V2X resource selection function a resource set.

In various implementations of the present disclosure, a Rel-17 NR UE includes a new operation that is capable of receiving from the network's NR V2X Control Function a resource set to enhance the V2X resource selection capabilities of the Rel-17 NR UE.

In various implementations of the present disclosure, a Rel-17 NR UE includes a new operation that is capable of configuring the physical layer of the Rel-17 NR UE to use a specific resource set for the purpose of establishing an SL communications channel with another Rel-17 NR UE, for the further purpose of determining the direction from the two UEs.

In various implementations of the present disclosure, a Rel-17 NR UE includes a new operation that is capable of forwarding to the network's NR V2X Control Function an indication of which beam was chosen by another Rel-17 NR UE to establish a connection to the Rel-17 NR UE via the SL communications channel.

In various implementations of the present disclosure, a Rel-17 NR UE includes a new mechanism that can map the indication of which beam was chosen by another Rel-17 NR UE to establish an SL connection to the Rel-17 NR UE, to a beam index of the resource set.

In various implementations of the present disclosure, a Rel-17 NR UE includes a new operation that is capable of forwarding to the network's NR V2X Control Function a report regarding the QoS of the beam chosen by another Rel-17 NR UE to establish an SL connection to the Rel-17 NR UE.

In various implementations of the present disclosure, a Rel-17 NR UE includes a new mechanism that provides as input to the network's NR V2X Control Function the results of a ranging operation which may include: the beam selected to establish the SL connection, the resource set used to establish the SL connection, and a QoS value of the establish SL connection via a 3-Tuple of [Resource set unique ID, Beam Index, QoS].

SUMMARY

In one example, a method by a User Equipment (UE) for sidelink (SL) communication with another UE, the method comprising: establishing a first SL connection from the UE to the another UE using a first resource set, the first resource set including an identifier (ID) of the first resource set, parameters for configuring a first Vehicle to Everything (V2X) Resource Pool, and Beam Management (BM) parameters associated with the first V2X Resource Pool for enabling a first set of directional transmission beams; receiving, by the UE from the another UE, a Quality of Service (QoS) value associated with a first beam of the first set of directional transmission beams used for establishing the first SL connection; and reporting, by the UE to a New Radio (NR) V2X Control Function, the ID of the first resource set, a first beam index identifying the first beam, and the QoS value associated with the first beam.

In one example, the method, further comprising: receiving, by the UE from the NR V2X Control Function, a second resource set including an ID of the second resource set, parameters for configuring a second V2X Resource Pool, and BM parameters associated with the second V2X Resource Pool for enabling a second set of directional transmission beams, when the NR V2X Control Function determines that the first beam is not an optimal beam for SL communication from the UE to the another UE and configures the second resource set to the UE to establish a second SL connection from the UE to the another UE; establishing the second SL connection from the UE to the another UE using the second resource set; receiving, by the UE from the another UE, a QoS value associated with a second beam of the second set of directional transmission beams used for establishing the second SL connection; and reporting, by the UE to the NR V2X Control Function, the ID of the second resource set, a second beam index identifying the first beam, and the QoS value associated with the second beam.

In one example, the method, further comprising: determining, by the UE, the first beam index identifying the first beam of the first set of directional transmission beams the another UE has chosen to establish the first SL connection.

In one example, the method, further comprising: determining, by the UE, the second beam index identifying the second beam of the second set of directional transmission beams the another UE has chosen to establish the second SL connection.

In one example, the method, further comprising: providing, from the UE to the NR V2X Control Function, an indication that the UE is capable of a ranging function using an SL channel in combination with a BM process, the ranging function resolving a direction and an inclination from the UE to the another UE.

In one example, the method, wherein the indication includes: a maximum number of array elements of each antenna used by the UE; a frequency range of each antenna used by the UE; a number of antennas used by the UE.

In one example, the method, wherein the NR V2X Control Function makes a ranging direction determination from the UE to the another UE based on the indication from the UE, the QoS value associated with the first beam, the first beam index, and the ID of the first resource set.

In one example, the method, further comprising: providing, from the UE to the NR V2X Control Function, an indication that the UE is capable of a ranging function using an SL channel in combination with a BM process, the ranging function resolving a direction and an inclination from the UE to the another UE; wherein the indication includes: a maximum number of array elements of each antenna used by the UE; a frequency range of each antenna used by the UE; a number of antennas used by the UE; wherein the NR V2X Control Function makes a ranging direction determination from the UE to the another UE based on the indication from the UE, the QoS value associated with the second beam, the second beam index, and the ID of the second resource set.

In one example, the method, further comprising: mapping each of the first set of directional transmission beams used for establishing the first SL connection to a beam index.

In one example, the method, wherein at least one of the QoS value associated with the first beam and the QoS value associated with the second beam is provided by the another UE to the UE via a PC5 Radio Resource Control (RRC) message MeasurementReportSidelink.

In one example, the method, wherein the first resource set is provided by the New Radio (NR) V2X Control Function to the UE via information elements SL-DirConfigCommon-r17 carried by a System Information Block 12 (SIB12) broadcast by a base station.

In one example, the method, further comprising: sending a message to a base station requesting the base station to provide the first resource set via dedicated signaling.

In one example, the method, wherein the first resource set is provided to the UE by the base station via information elements SL-DirConfigDedicated-r17 carried by a Radio Resource Control (RRC) reconfiguration (RRCReconfiguration) message.

In one example, the method, wherein a directional ranging bit is configured in a System Information Block 12 (SIB12) broadcast by a base station to enable the UE to use a preconfigured resource set as the first resource set.

In one example, the method, wherein at least one of the QoS value associated with the first beam and the QoS value associated with the second beam is provided by the another UE to the UE via a PC5 Radio Resource Control (RRC) message.

In one example, the method, wherein the first resource set is provided by the New Radio (NR) V2X Control Function to the UE via information elements carried by a System Information Block (SIB) broadcast by a base station.

In one example, the method, wherein the first resource set is provided to the UE by the base station via information elements carried by a Radio Resource Control (RRC) reconfiguration (RRCReconfiguration) message.

In one example, the method, wherein a directional ranging bit is configured in a System Information Block (SIB) broadcast by a base station to enable the UE to use a preconfigured resource set as the first resource set.

In one example, a user equipment (UE), comprising: one or more non-transitory computer-readable media having computer-executable instructions embodied thereon; at least one processor coupled to the one or more non-transitory computer-readable media, and configured to execute the computer-executable instructions to: establish a first SL connection from the UE to the another UE using a first resource set, the first resource set including an identifier (ID) of the first resource set, parameters for configuring a first Vehicle to Everything (V2X) Resource Pool, and Beam Management (BM) parameters associated with the first V2X Resource Pool for enabling a first set of directional transmission beams; receive, from the another UE, a Quality of Service (QoS) value associated with a first beam of the first set of directional transmission beams used for establishing the first SL connection; and report, to a New Radio (NR) V2X Control Function, the ID of the first resource set, a first beam index identifying the first beam, and the QoS value associated with first beam.

In one example, the UE, wherein the at least one processor is further configured to execute the computer-executable instructions to: receive, from the NR V2X Control Function, a second resource set including an ID of the second resource set, parameters for configuring a second V2X Resource Pool, and BM parameters associated with the second V2X Resource Pool for enabling a second set of directional transmission beams, when the NR V2X Control Function determines that the first beam is not an optimal beam for SL communication from the UE to the another UE and configures the second resource set to the UE to establish a second SL connection from the UE to the another UE; establish the second SL connection from the UE to the another UE using the second resource set; receive, from the another UE, a QoS value associated with a second beam of the second set of directional transmission beams used for establishing the second SL connection; and report, to the NR V2X Control Function, the ID of the second resource set, a second beam index identifying the first beam, and the QoS value associated with the second beam.

In one example, the UE, wherein the at least one processor is further configured to execute the computer-executable instructions to: determine the first beam index identifying the first beam of the first set of directional transmission beams the another UE has chosen to establish the first SL connection.

In one example, the UE, wherein the at least one processor is further configured to execute the computer-executable instructions to: determine the second beam index identifying the second beam of the second set of directional transmission beams the another UE has chosen to establish the second SL connection.

In one example, the UE, wherein the at least one processor is further configured to execute the computer-executable instructions to: provide, to the NR V2X Control Function, an indication that the UE is capable of a ranging function using an SL channel in combination with a BM process, the ranging function resolving a direction and an inclination from the UE to the another UE.

In one example, the UE, wherein the indication includes: a maximum number of array elements of each antenna used by the UE; a frequency range of each antenna used by the UE; a number of antennas used by the UE.

In one example, the UE, wherein the NR V2X Control Function makes a ranging direction determination from the UE to the another UE based on the indication from the UE, the QoS value associated with the first beam, the first beam index, and the ID of the first resource set.

In one example, the UE, wherein: the at least one processor is further configured to execute the computer-executable instructions to: provide, from the UE to the NR V2X Control Function, an indication that the UE is capable of a ranging function using an SL channel in combination with a BM process, the ranging function resolving a direction and an inclination from the UE to the another UE; the indication includes: a maximum number of array elements of each antenna used by the UE; a frequency range of each antenna used by the UE; a number of antennas used by the UE; the NR V2X Control Function makes a ranging direction determination from the UE to the another UE based on the indication from the UE, the QoS value associated with the second beam, the second beam index, and the ID of the second resource set.

In one example, the UE, wherein the at least one processor is further configured to execute the computer-executable instructions to: map each of the first set of directional transmission beams used for establishing the first SL connection to a beam index.

In one example, the UE, wherein at least one of the QoS value associated with the first beam and the QoS value associated with the second beam is provided by the another UE to the UE via a PC5 Radio Resource Control (RRC) message MeasurementReportSidelink.

In one example, the UE, wherein the first resource set is provided by the New Radio (NR) V2X Control Function to the UE via information elements SL-DirConfigCommon-r17 carried by a System Information Block 12 (SIB12) broadcast by a base station.

In one example, the UE, wherein the at least one processor is further configured to execute the computer-executable instructions to: send a message to a base station requesting the base station to provide the first resource set via dedicated signaling.

In one example, the UE, wherein the first resource set is provided to the UE by the base station via information elements SL-DirConfigDedicated-r17 carried by a Radio Resource Control (RRC) reconfiguration (RRCReconfiguration) message.

In one example, the UE, wherein a directional ranging bit is configured in a System Information Block 12 (SIB12) broadcast by a base station to enable the UE to use a preconfigured resource set as the first resource set.

In one example, a method by a User Equipment (UE) for sidelink (SL) communication with another UE, the method comprising: connecting to the another UE through a first SL connection, the first SL connection being established by the another UE using a first resource set, the first resource set including an identifier (ID) of the first resource set, parameters for configuring a first Vehicle to Everything (V2X) Resource Pool, and Beam Management (BM) parameters associated with the first V2X Resource Pool for enabling a first set of directional transmission beams; providing, to the another UE, a Quality of Service (QoS) value associated with a first beam of the first set of directional transmission beams used for establishing the first SL connection.

In one example, the method, further comprising: connecting to the another UE through a second SL connection, the second SL connection being established by the another UE using a second resource set, when a New Radio (NR) V2X Control Function determines that the first beam is not an optimal beam for SL communication between the UE and the another UE and configures the second resource set to the another UE to establish the second SL connection, the second resource set including an ID of the second resource set, parameters for configuring a second V2X Resource Pool, and BM parameters associated with the second V2X Resource Pool for enabling a second set of directional transmission beams; providing, to the another UE, a Quality of Service (QoS) value associated with a second beam of the second set of directional transmission beams used for establishing the second SL connection.

In one example, the method, wherein each of the first set of directional transmission beams used for establishing the first SL connection is mapped to a beam index.

In one example, the method, wherein at least one of the QoS value associated with the first beam and the QoS value associated with the second beam is provided by the UE to the another UE via a PC5 Radio Resource Control (RRC) message MeasurementReportSidelink.

In one example, the method, wherein the first resource set is provided by the New Radio (NR) V2X Control Function to the another UE via information elements SLDirConfig-Common-r17 carried by a System Information Block 12 (SIB12) broadcast by a base station.

In one example, the method, wherein the first resource set is provided to the another UE by the base station via information elements SL-DirConfigDedicated-r17 carried by a Radio Resource Control (RRC) reconfiguration (RRCReconfiguration) message.

In one example, the method, wherein a directional ranging bit is configured in a System Information Block 12 (SIB12) broadcast by a base station to enable the another UE to use a preconfigured resource set as the first resource set.

In one example, a user equipment (UE), comprising: one or more non-transitory computer-readable media having computer-executable instructions embodied thereon; at least one processor coupled to the one or more non-transitory computer-readable media, and configured to execute the computer-executable instructions to: connect to the another UE through a first SL connection, the first SL connection being established by the another UE using a first resource set, the first resource set including an identifier (ID) of the first resource set, parameters for configuring a first Vehicle to Everything (V2X) Resource Pool, and Beam Management (BM) parameters associated with the first V2X Resource Pool for enabling a first set of directional transmission beams;

provide, to the another UE, a Quality of Service (QoS) value associated with a first beam of the first set of directional transmission beams used for establishing the first SL connection.

In one example, the UE, wherein the at least one processor is further configured to execute the computer-executable instructions to: connect to the another UE through a second SL connection, the second SL connection being established by the another UE using a second resource set, when a New Radio (NR) V2X Control Function determines that the first beam is not an optimal beam for SL communication between the UE and the another UE and configures the second resource set to the another UE to establish the second SL connection, the second resource set including an ID of the second resource set, parameters for configuring a second V2X Resource Pool, and BM parameters associated with the second V2X Resource Pool for enabling a second set of directional transmission beams; provide, to the another UE, a Quality of Service (QoS) value associated with a second beam of the second set of directional transmission beams used for establishing the second SL connection.

In one example, the UE, wherein each of the first set of directional transmission beams used for establishing the first SL connection is mapped to a beam index.

In one example, the UE, wherein at least one of the QoS value associated with the first beam and the QoS value associated with the second beam is provided by the UE to the another UE via a PC5 Radio Resource Control (RRC) message MeasurementReportSidelink.

In one example, the UE, wherein the first resource set is provided by the New Radio (NR) V2X Control Function to the another UE via information elements SL-DirConfig-Common-r17 carried by a System Information Block 12 (SIB12) broadcast by a base station.

In one example, the UE, wherein the first resource set is provided to the another UE by the base station via information elements SL-DirConfigDedicated-r17 carried by a Radio Resource Control (RRC) reconfiguration (RRCReconfiguration) message.

In one example, the UE, wherein a directional ranging bit is configured in a System Information Block 12 (SIB12) broadcast by a base station to enable the another UE to use a preconfigured resource set as the first resource set.

What is claimed is:

1. A user equipment (UE), comprising:

one or more non-transitory computer-readable media storing one or more computer-executable instructions; and at least one processor coupled to the one or more non-transitory computer-readable media and configured to execute the one or more computer-executable instructions to cause the UE to:

establish a first sidelink (SL) connection between the UE and another UE using a first resource set, the first resource set including an identifier (ID) of the first resource set, parameters for configuring a first Vehicle to Everything (V2X) Resource Pool, and Beam Management (BM) parameters associated with the first V2X Resource Pool for enabling a first set of directional transmission beams;

receive, from the other UE, a Quality of Service (QoS) value associated with a first beam of the first set of directional transmission beams used for establishing the first SL connection, and transmit, via a Uu interface, to a New Radio (NR) V2X Control Function, the ID of the first resource set, a first beam index identifying the first beam, and the QoS value associated with the first beam.

2. The UE of claim 1, wherein the at least one processor is further configured to execute the one or more computer-executable instructions to cause the UE to:

receive, from the NR V2X Control Function, a second resource set including an ID of the second resource set, parameters for configuring a second V2X Resource Pool, and BM parameters associated with the second V2X Resource Pool for enabling a second set of directional transmission beams, when the NR V2X Control Function determines that the first beam is not an optimal beam for SL communication between the UE and the other UE, and the NR V2X Control Function configures the second resource set to the UE to establish a second SL connection between the UE and the other UE;

establish the second SL connection between the UE and the other UE using the second resource set;

receive, from the other UE, a QoS value associated with a second beam of the second set of directional transmission beams used for establishing the second SL connection; and report, to the NR V2X Control Function, the ID of the second resource set, a second beam index identifying the second beam, and the QoS value associated with the second beam.

3. The UE of claim 1, wherein the at least one processor is further configured to execute the one or more computer-executable instructions to cause the UE to:

determine the first beam index, that identifies the first beam of the first set of directional transmission beams, which the other UE has chosen to establish the first SL connection.

4. The UE of claim 2, wherein the at least one processor is further configured to execute the one or more computer-executable instructions to cause the UE to:

determine the second beam index, that identifies the second beam of the second set of directional transmission beams, which the other UE has chosen to establish the second SL connection.

5. The UE of claim 2, wherein the at least one processor is further configured to execute the one or more computer-executable instructions to cause the UE to:

provide, to the NR V2X Control Function, an indication indicating that the UE is capable of performing a ranging function using an SL channel in combination with a BM process, the ranging function resolving a direction and an inclination in the second SL connection between the UE and the other UE.

6. The UE of claim 5, wherein the indication includes:

a maximum number of array elements of each antenna used by the UE;

a frequency range of each antenna used by the UE; and a number of antennas used by the UE.

7. The UE of claim 5, wherein the NR V2X Control Function makes a ranging direction determination for the second SL connection between the UE and the other UE based on the indication, the QoS value associated with the first beam, the first beam index, and the ID of the first resource set.

8. The UE of claim 2, wherein the at least one processor is further configured to execute the one or more computer-executable instructions to cause the UE to:

provide, to the NR V2X Control Function, an indication indicating that the UE is capable of performing a ranging function using an SL channel in combination with a BM process, the ranging function resolving a direction and an inclination in the second SL connection between the UE and the other UE, wherein:

the indication includes:

a maximum number of array elements of each antenna used by the UE, a frequency range of each antenna used by the UE, and a number of antennas used by the UE, and the NR V2X Control Function makes a ranging direction determination for the second SL connection between the UE and the other UE based on the indication, the QoS value associated with the second beam, the second beam index, and the ID of the second resource set.

9. The UE of claim 1, wherein the at least one processor is further configured to execute the one or more computer-executable instructions to cause the UE to:

map each of the first set of directional transmission beams used for establishing the first SL connection to a beam index.

10. The UE of claim 2, wherein at least one of the QoS value associated with the first beam and the QoS value associated with the second beam is provided, by the other UE, to the UE, via a PC5 Radio Resource Control (RRC) message MeasurementReportSidelink.

11. The UE of claim 1, wherein the first resource set is provided, by the NR V2X Control Function, to the UE, via information elements carried by System Information broadcast by a base station.

12. The UE of claim 1, wherein the at least one processor is further configured to execute the one or more computer-executable instructions to cause the UE to:

send a message, to a base station, requesting the base station to provide the first resource set via dedicated signaling.

13. The UE of claim 12, wherein the first resource set is provided to the UE, by the base station, via information elements carried by a Radio Resource Control (RRC) reconfiguration (RRC Reconfiguration) message.

14. The UE of claim 1, wherein a directional ranging bit is configured in System Information broadcast by a base station to enable the UE to use a preconfigured resource set as the first resource set.

15. A user equipment (UE), comprising:

one or more non-transitory computer-readable media storing one or more computer-executable instructions; and at least one processor coupled to the one or more non-transitory computer-readable media and configured to execute the one or more computer-executable instructions to cause the UE to:

connect to another UE through a first sidelink (SL) connection, the first SL connection being established by the other UE using a first resource set, the first resource set including an identifier (ID) of the first resource set, parameters for configuring a first Vehicle to Everything (V2X) Resource Pool, and Beam Management (BM) parameters associated with the first V2X Resource Pool for enabling a first set of directional transmission beams, and provide, to the other UE, a Quality of Service (QoS) value associated with a first beam of the first set of directional transmission beams used for establishing the first SL connection.

* * * * *